(12) United States Patent
Nakamoto

(10) Patent No.: US 10,676,224 B2
(45) Date of Patent: Jun. 9, 2020

(54) PACKAGING MACHINE AND PACKAGING METHOD

(71) Applicant: TOYO JIDOKI CO., LTD., Tokyo (JP)

(72) Inventor: Kakue Nakamoto, Iwakuni (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 636 days.

(21) Appl. No.: 15/353,449

(22) Filed: Nov. 16, 2016

(65) Prior Publication Data

US 2017/0152067 A1 Jun. 1, 2017

(30) Foreign Application Priority Data

Nov. 26, 2015 (JP) ................................. 2015-230683

(51) Int. Cl.
*B65B 43/26* (2006.01)
*B65B 43/50* (2006.01)
(Continued)

(52) U.S. Cl.
CPC .............. *B65B 43/26* (2013.01); *B65B 43/14* (2013.01); *B65B 43/42* (2013.01); *B65B 43/465* (2013.01);
(Continued)

(58) Field of Classification Search
CPC ......... B65B 43/26; B65B 43/42; B65B 43/60; B65B 43/50; B65B 43/14; B65B 43/465;
(Continued)

(56) References Cited

U.S. PATENT DOCUMENTS 3,053,027 A * 9/1962 Frost ....................... B65B 43/16
53/571
6,199,601 B1 * 3/2001 Laudenberg .......... B65B 31/041
141/114
(Continued)

FOREIGN PATENT DOCUMENTS

CN 203832825 U 9/2014
JP H08-133212 A 5/1996
(Continued)

OTHER PUBLICATIONS

Notification of Reason for Rejection dated Jan. 22, 2019 issued in corresponding Japanese Patent Application No. 2015-230683 with English translation.
(Continued)

*Primary Examiner* — Chelsea E Stinson
*Assistant Examiner* — Thomas M Wittenschlaeger
(74) *Attorney, Agent, or Firm* — Pillsbury Winthrop Shaw Pittman, LLP

(57) ABSTRACT

A packaging machine includes: a linear type conveyance unit conveying a bag linearly in a first direction; a rotary type conveyance unit conveying the bag rotationally in a second direction; a delivery unit delivering the bag between the linear type and the rotary type conveyance units; a first processing system performing processing on the bag conveyed by the linear type conveyance unit; and a second processing system performing processing on the bag conveyed by the rotary type conveyance unit, wherein: the linear type conveyance unit includes: a first supporting unit moving from a first conveyance position to a second conveyance position while supporting the bag in a suspended state; and a second supporting unit which receives the bag from the first supporting unit at the second conveyance position and supports the bag in a suspended state, and the
(Continued)

second processing system includes an opening processing unit.

19 Claims, 8 Drawing Sheets

(51) Int. Cl.
    *B65B 57/04*     (2006.01)
    *B65B 65/02*     (2006.01)
    *B65C 1/02*     (2006.01)
    *B65B 43/14*     (2006.01)
    *B65B 43/42*     (2006.01)
    *B65B 43/60*     (2006.01)
    *B65B 43/46*     (2006.01)
    *B65G 47/86*     (2006.01)
    *B65G 25/04*     (2006.01)

(52) U.S. Cl.
    CPC ............. *B65B 43/50* (2013.01); *B65B 43/60* (2013.01); *B65B 57/04* (2013.01); *B65B 65/02* (2013.01); *B65C 1/02* (2013.01); *B65G 25/04* (2013.01); *B65G 47/847* (2013.01)

(58) Field of Classification Search
    CPC ........... B65B 57/04; B65B 65/02; B65C 1/02; B65G 25/04; B65G 47/847
    USPC .......................................................... 53/571
    See application file for complete search history.

(56) References Cited

U.S. PATENT DOCUMENTS

| | | | | |
|---|---|---|---|---|
| 6,244,307 | B1* | 6/2001 | Araki | B65B 43/465 141/10 |
| 9,114,569 | B2* | 8/2015 | Murray | B29C 65/74 |
| 9,346,568 | B2* | 5/2016 | Korte | B65B 43/465 |
| 9,352,860 | B2* | 5/2016 | Vollenkemper | B65B 43/465 |
| 9,505,504 | B2* | 11/2016 | Murray | B65B 31/042 |
| 9,522,751 | B2* | 12/2016 | Baltes | B65B 3/025 |
| 2001/0019007 | A1* | 9/2001 | Kondo | B65B 65/02 198/464.3 |
| 2006/0199716 | A1* | 9/2006 | Tsutsui | B29C 65/18 493/87 |
| 2006/0243559 | A1* | 11/2006 | Martelli | B65B 5/04 198/347.1 |
| 2007/0074492 | A1* | 4/2007 | Koga | B65B 43/36 53/512 |
| 2008/0072547 | A1* | 3/2008 | Murray | B65B 9/08 53/451 |
| 2010/0199599 | A1* | 8/2010 | Bonnain | B65B 5/026 53/147 |
| 2012/0289391 | A1* | 11/2012 | Murray | B31B 50/00 493/227 |
| 2013/0343857 | A1* | 12/2013 | Yoshikane | B65B 43/14 414/798.9 |
| 2014/0360133 | A1* | 12/2014 | Yoshikane | B65B 43/30 53/386.1 |
| 2015/0284122 | A1* | 10/2015 | Murray | B65B 43/04 248/99 |
| 2015/0291300 | A1* | 10/2015 | Brandt Sanz | B65B 61/025 428/35.2 |
| 2016/0122057 | A1* | 5/2016 | Takahashi | B65B 5/067 53/284.7 |

FOREIGN PATENT DOCUMENTS

| | | |
|---|---|---|
| JP | 2002-036392 A | 2/2002 |
| JP | 2002-302227 A | 10/2002 |
| JP | 2012-240710 A | 12/2012 |
| JP | 2015-054702 A | 3/2015 |
| JP | 2015-147594 A | 8/2015 |

OTHER PUBLICATIONS

First Notification of Reasons for Refusal dated Feb. 3, 2019 issued in corresponding Chinese Patent Application No. 201611049533.4 with English translation.

* cited by examiner

PACKAGING MACHINE AND PACKAGING METHOD

CROSS-REFERENCE TO RELATED APPLICATIONS

This application is based upon and claims the benefit of priority from Japanese Patent Application No. 2015-230683, filed on Nov. 26, 2015; the entire contents of which are incorporated herein by reference.

TECHNICAL FIELD

The present invention is related to a packaging machine and a packaging method, in particular, is related to a packaging machine and a packaging method that are each involving a process of opening a packaging bag.

BACKGROUND ART

A bag packaging machine is known which consecutively performs a plurality of processes on many bags. For example, a process of taking empty packaging bags consecutively out of a storage part, a process of opening each packaging bag, a process of feeding contents into each packaging bag, and a process of closing and sealing the opening section of each bag are consecutively performed, so that many product bags are manufactured in an efficient and speedy manner.

There are various types of the packaging machine like this, and for example, a rotary type packaging machine is widely known. In a rotary type packaging machine, typically, a plurality of grippers are attached to the outer edge part of a rotatable rotary table, and devices that perform various processes required for manufacturing a packaging bag (i.e., product bag) are provided around the rotary table. While bags supported by grippers are conveyed by the rotary table, various processes on the bags are performed, so that product bags are consecutively manufactured.

Furthermore, Japanese patent application publication No. 2002-302227 discloses a racetrack type packaging machine using an endless chain. In the packaging machine disclosed in Japanese patent application publication No. 2002-302227, a plurality of gripper pairs for gripping both edges of a bag are provided, at regular intervals, with the endless chain guided by a linear guide member, and by turning the endless chain, bags gripped by the gripper pairs are conveyed at a constant speed.

Furthermore, Japanese patent application publication No. 2012-240710 discloses a linear conveyance type packaging machine that linearly conveys a bag between a filling processing position and a seal processing position.

Furthermore, Japanese patent application publication No. 08-133212 discloses a packaging apparatus comprising a bag manufacturing part that manufactures a bag from a rolled film, and a reverse mechanism that shifts the position of a bag supplied in a horizontal posture from the bag manufacturing part so as to have a vertical posture. When this packaging apparatus fills into a bag with a fluidized powder and a solid material, the bag pinched by a first gripper is delivered to a second gripper via a sub-gripper.

Furthermore, Japanese patent application publication No. 2015-147594 discloses a bag transfer device that shifts a bag into which air has been blown in a horizontal state, into a vertical state, and then causes a gripper pair installed on a rotary table to grip the bag and conveys it.

Furthermore, Japanese patent application publication No. 2015-54702 discloses a printing packaging apparatus in which a package design is printed, by a printing device, onto a packaging member conveyed horizontally, and then the packaging member is filled with contents (i.e., pet food) and sealed.

SUMMARY OF INVENTION

Technical Problem

Various types of packaging machines are known as described above, but each type of packaging machine has problems as described below.

For example, in a rotary type packaging machine, an bag before opening is in an empty state and has a flat shape, and is in a state where the stiffness is weak in terms of the direction towards which the front and rear surfaces face; therefore, due to the centrifugal force acting on a bag during rotational conveyance of the bag, the posture of the bag tends to become unstable in the front/rear surface direction. Thus, when a process using a printing device or a printing inspection device is performed during the rotational conveyance, it is required to install a guide for stabilizing the posture of a bag; however, installation of such a guide requires additional costs and space, as well as inviting concern about damaging a bag due to the guide. Furthermore, when precision apparatuses vulnerable to water, such as a printing device and a printing inspection device, are installed around a rotary table together with a device using a liquid such as a content feeding device or a washing device, there is concern that the liquid spatters and the precision apparatuses have a breakdown.

Moreover, in a manufacturing process of product bags, product bags that fail to receive a proper process and therefore should be treated as defective products are also manufactured. Packaging bags called defective products (hereinafter, also referred to as "defective bags") may include difficult-to-reuse packaging bags as well as reusable packaging bags. For example, a packaging bag having no printing due to skip of printing performed by a printing device is reusable, and is desirably reused from the viewpoint of effective utilization of resources. However, even if a rotary type packaging machine includes a step of removing defective bags, such a step of removing defective bags is generally performed without determining whether or not defective bags removed in that step are reusable. It takes a lot of trouble with manual selection of only reusable defective bags in a state where there are both reusable defective bags and non-reusable defective bags, and furthermore, installing a device which can automatically select only reusable defective bags invites increase in cost and size of the apparatus. Therefore, it is desired to propose a new mechanism enabling reusable defective bags to be selected simply and conveniently.

Furthermore, a racetrack type packaging machine as disclosed in Japanese patent application publication No. 2002-302227 includes a chain as an essential element, and the chain gradually stretches as the operating time proceeds. Therefore, in a racetrack type packaging machine, it is unavoidable to install a mechanism for absorbing such stretch of the chain, and thus the device structure gets complex and also the manufacturing cost increases.

Furthermore, a linear conveyance type packaging machine as disclosed in Japanese patent application publication No. 2012-240710 has low flexibility in device layout, and for example, if the number of processes is increased, a packaging machine becomes larger only in one direction as a whole.

Furthermore, as in a packaging apparatus disclosed in Japanese patent application publication No. 08-133212, when a packaging bag is delivered between gripper pairs, there is concern that a predetermined part of the packaging bag is not properly gripped by means of a gripper during the delivery of the packaging bag. In particular, in a case where a packaging bag is delivered between gripper pairs during feeding of contents into the packaging bag or after feeding of contents, the packaging bag gets heavy as a whole and therefore the position gripped by grippers is displaced easily. Furthermore, concerning the size of a packaging bag in the upper/lower direction, it is required to secure "the bulk of contents inside a packaging bag in the upper/lower direction", "the gripping space for gripper pairs in the upper/lower direction", and "the sealing space of the opening section of a packaging member". When a packaging bag is gripped, at different positions in the upper/lower direction, by respective gripper pairs for delivery of the packaging bag, it is required to size up each packaging bag in the upper/lower direction, compared to a case where a packaging bag is gripped by a single gripper pair. As a result, the head space of a packaging bag becomes larger, it is difficult to manufacture a compact packaging bag, and the appearance quality of a packaging bag (product bag), such as tight impression, is lost.

Furthermore, when "a step of linearly conveying a packaging bag in a horizontal state" and "a step of rotationally conveying a packaging bag" are combined as in apparatuses disclosed in Japanese patent application publication Nos. 2015-147594 and 2015-54702, processes which can be performed during the linear conveyance step are limited. Specifically, it is required during the linear conveyance step to perform a process on a packaging bag which is in a horizontal state; therefore, for example, it is easy to perform a process such as printing on an exposed surface (e.g., an upward surface) of a packaging bag, but it is not easy to perform a process such as printing on a non-exposed surface (e.g., an downward surface) of a packaging bag.

As described above, in each of a rotary type packaging machine, a linear conveyance type packaging machine, and a packaging machine adopting a plurality of conveyance methods combined, it is very difficult to perform both "a process performed in a state where a packaging bag is closed (such as a printing process)" and "a process performed in a state where a package bag is opened (such as a content feeding process)" in a simple and highly accurate manner.

Solution to Problem

The present invention has been contrived in light of the above-mentioned circumstances, and an object thereof is to provide a packaging machine and a packaging method which enable a process performed in a state where a packaging bag is closed and a process performed in a state where a package bag is opened to be carried out in series in a simple and highly accurate manner.

One aspect of the present invention is directed to a packaging machine comprising: a linear type conveyance unit which conveys a packaging bag in a linear manner in a first direction; a rotary type conveyance unit which conveys the packaging bag in a rotational manner in a second direction; a delivery unit which delivers the packaging bag between the linear type conveyance unit and the rotary type conveyance unit; a first processing system which performs processing on the packaging bag conveyed by the linear type conveyance unit; and a second processing system which performs processing on the packaging bag conveyed by the rotary type conveyance unit, wherein: the linear type conveyance unit includes: a first supporting unit which moves from a first conveyance position to a second conveyance position while supporting the packaging bag in a suspended state; and a second supporting unit which receives the packaging bag from the first supporting unit being disposed at the second conveyance position and supports the packaging bag in a suspended state, and the second processing system includes an opening processing unit which opens the packaging bag.

According to this aspect, the first processing system can perform processing without being affected by the processing performed by the second processing system. Thus, when a process performed in a state where a packaging bag is closed is performed by the first processing system and a process performed in a state where a packaging bag is opened is performed by the second processing system, these processes can be continuously performed in a simple and highly accurate manner.

Desirably, the second processing system includes a content supply unit which feeds a content into the packaging bag which is in an open state.

According to this aspect, the first processing system is not affected by feeding a content into a package bag.

Desirably, the delivery unit includes: a third supporting unit for supporting the packaging bag in a suspended state; and a delivery driving unit which reciprocates the third supporting unit between a third conveyance position and a fourth conveyance position, and the third supporting unit receives the packaging bag at the third conveyance position from the linear type conveyance unit, and supplies the packaging bag to the rotary type conveyance unit at the fourth conveyance position.

According to this aspect, a package bag is properly conveyed from the linear type conveyance unit to the rotary type conveyance unit.

Desirably, the delivery driving unit rotates the third supporting unit by prescribed degrees.

According to this aspect, the orientation of a package bag can be changed between the linear type conveyance unit and the rotary type conveyance unit.

Desirably, the rotary type conveyance unit includes: a rotation body; and a fourth supporting unit which is attached to the rotation body and is provided for supporting the packaging bag, a rotation center of the rotation body lies in an extension of a linear conveyance track of the packaging bag conveyed by the linear type conveyance unit, and the delivery driving unit rotates the third supporting unit by 90 degrees after the packaging bag is delivered from the linear type conveyance unit to the third supporting unit and before the packaging bag is delivered from the third supporting unit to the rotary type conveyance unit.

According to this aspect, a packaging bag can be properly conveyed from the linear type conveyance unit to the rotary type conveyance unit.

Desirably, the fourth conveyance position is distant from the third conveyance position in a direction perpendicular to the first direction.

The present invention can also be effectively applied to a packaging machine having a configuration based on this aspect Desirably, the packaging machine further comprises: a position detection unit which detects a position in a height direction of the packaging bag before being supplied to the third supporting unit or of the packaging bag being supported by the third supporting unit; and an elevating driving unit which is capable of changing the position in the height direction of the third supporting unit according to the position in the height direction of the packaging bag detected by the position detection unit.

According to this aspect, the position in the height direction of a packaging bag supported by the third supporting unit can be properly changed.

Desirably, the first processing system includes a printing unit which performs printing on the packaging bag conveyed by the linear type conveyance unit.

According to this aspect, the printing unit can perform a process without being affected by the process performed by the second processing system.

Desirably, the first processing system includes a printing inspection unit which is located on a downstream side from the printing unit and inspects quality of the printing on the packaging bag.

According to this aspect, the printing inspection unit can perform a process without being affected by the process performed by the second processing system.

Desirably, the packaging machine further comprises a discharge unit which discharges the packaging bag having a defect according to an inspection result of the printing inspection unit.

According to this aspect, a package bag having a printing defect can be discharged.

Another aspect of the present invention is directed to a packaging method comprising the steps of: causing a linear type conveyance unit to convey a packaging bag in a linear manner in a first direction; causing a rotary type conveyance unit to convey the packaging bag in a rotational manner in a second direction; causing a delivery unit to deliver the packaging bag between the linear type conveyance unit and the rotary type conveyance unit; causing a first processing system to perform processing on the packaging bag conveyed by the linear type conveyance unit; and causing a second processing system to perform processing on the packaging bag conveyed by the rotary type conveyance unit, wherein: the step of causing the linear type conveyance unit to convey a packaging bag includes the steps of: causing a first supporting unit to move from a first conveyance position to a second conveyance position while supporting the packaging bag in a suspended state; and causing a second supporting unit to receive the packaging bag from the first supporting unit being disposed at the second conveyance position and supports the packaging bag in a suspended state, and the second processing system includes an opening processing unit which opens the packaging bag.

According to the present invention, the first processing system can perform processing without being affected by the processing performed by the second processing system, and the processing performed by the first processing system and the processing performed by the second processing system can be simply and accurately performed in series.

DESCRIPTION OF EMBODIMENTS

With reference to the drawings, one embodiment of the present invention is described below.

Figure 1:
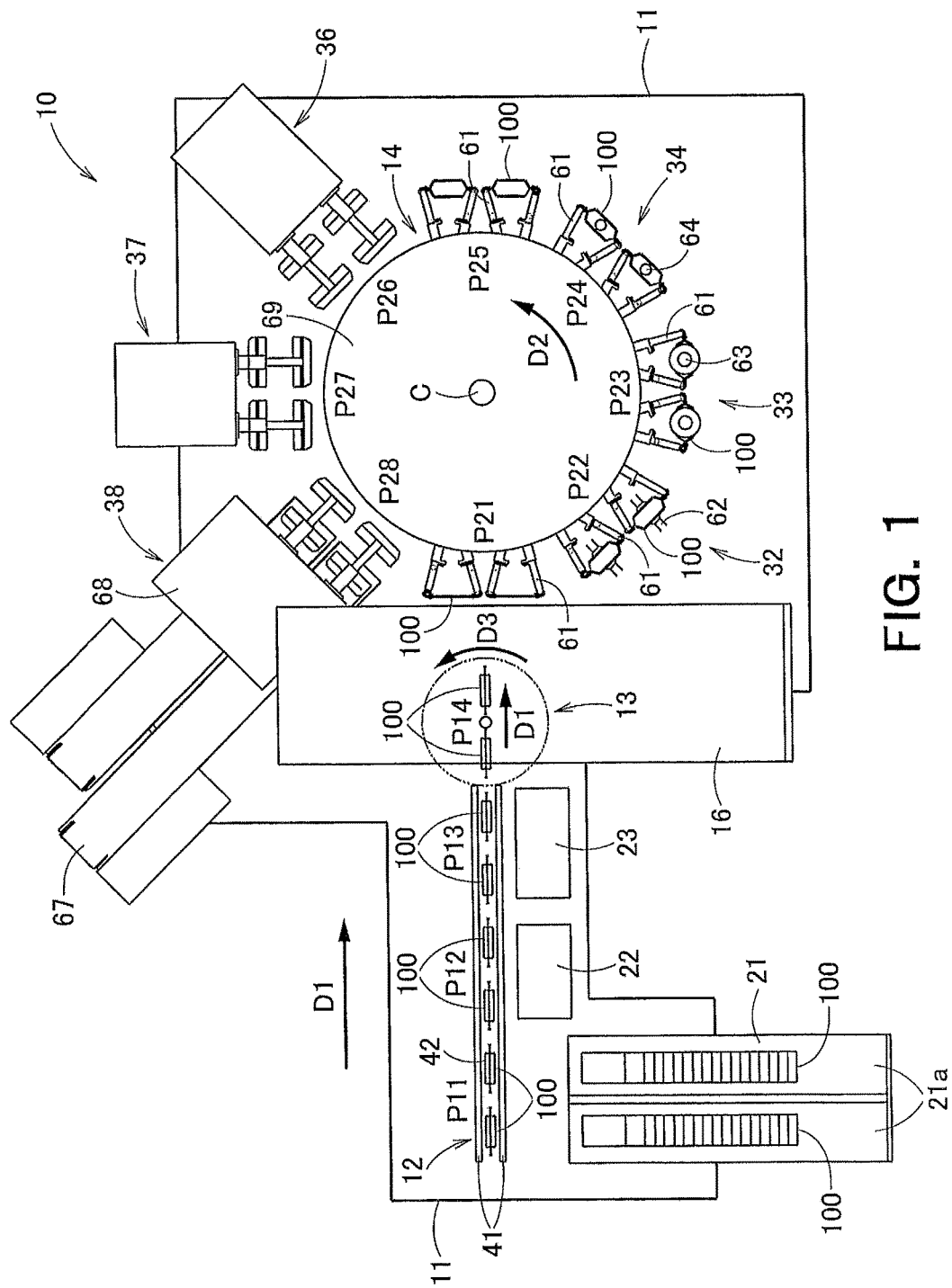
FIG. 1 is a plan view showing a schematic configuration of an example of a packaging machine according to one embodiment of the present invention.

FIG. 1 is a plan view showing a schematic configuration of an example of a packaging machine 10 according to one embodiment of the present invention, and shows the packaging machine 10 viewed from the above. The packaging machine 10 illustrated in FIG. 1 is a double type packaging machine (i.e., W-type packaging machine) which performs each process on two packaging bags 100 at one time. Note that the explanation below could be also applied to a single type packaging machine 10 which performs each process on one packaging bag 100 at a one time, a triple type packaging machine 10 which performs each process on three packaging bags 100 at a one time, a quadruple type packaging machine 10 which performs each process on four packaging bags 100 at a one time, and a packaging machine 10 which can perform each process on more packaging bags 100 at one time.

The packaging machine 10 comprises a linear type conveyance unit 12, a rotary type conveyance unit 14, and a delivery unit 13 provided between the linear type conveyance unit 12 and the rotary type conveyance unit 14. The linear type conveyance unit 12, the delivery unit 13 and the rotary type conveyance unit 14 are installed on a base 11. The linear type conveyance unit 12 horizontally conveys empty packaging bags 100 each having a sheet shape in a first direction D1 in a linear manner. The rotary type conveyance unit 14 horizontally conveys packaging bags 100 in a second direction D2 in a rotational manner. The delivery unit 13 conveys a packaging bag 100 in the first direction D1 and in a third direction D3, and delivers the packaging bag 100 between the linear type conveyance unit 12 and the rotary type conveyance unit 14.

The linear type conveyance unit 12 and the rotary type conveyance unit 14 according to the present embodiment intermittently convey packaging bags 100 from the upstream side towards the downstream side. While packaging bags 100 are stopped intermittently, various devices included in first and second processing systems described later perform various processes. The conveyance of a packaging bag 100 with the linear type conveyance unit 12 and the rotary type conveyance unit 14 is performed in a state where the part corresponding to the mouth of the packaging bag 100 is directed towards the upside in terms of the vertical direction and one of the both side edges of the packaging bag 100 is directed towards the traveling direction. Thus, the air resistance applied to a packaging bag 100 during the conveyance can be suppressed, and the posture of a packaging bag 100 can be kept stably.

The conveyance route of a packaging bag 100 with the linear type conveyance unit 12 forms a straight line conveyance track, and the first processing system which performs processing on packaging bags 100 conveyed with the linear type conveyance unit 12 is located in the neighborhood of this conveyance route. This first processing system includes various devices performing processes which are carried out preferably in a state where the mouth of a packaging bag 100 is not opened or performing processes which do not necessitate opening the mouth of a packaging bag 100. In the present embodiment, the first processing system includes an empty bag storing unit 21, a bag supply unit (see reference numeral "25" in FIG. 3 described later), a printing unit 22 and a printing inspection unit 23.

The empty bag storing unit 21 is positioned adjacent to the linear type conveyance unit 12 in an empty bag supply processing station P11, and stores empty packaging bags 100. The storing manner of the empty bag storing unit 21 is not particularly limited, and for example, a single storing conservation section 21a or a plurality of storing conservation sections 21a, in which a plurality of packaging bags 100 are stored, may be provided. When the empty bag storing unit 21 has a plurality of storing conservation sections 21a, a plurality of packaging bags 100 can be supplied, at one time, to the linear type conveyance unit 12 from the plurality of storing conservation sections 21a respectively. For example, in the example illustrated in FIG. 1, two storing conservation sections 21a are provided, and two packaging bags 100 can be supplied to the linear type conveyance unit 12 at one time.

A bag supply unit (see reference numeral "25" in FIG. 3 described later) is provided between the storing conservation section 21a and the linear type conveyance unit 12. This bag supply unit can adopt any configuration as long as a packaging bag 100 can be properly supplied from the storing conservation section 21a to the linear type conveyance unit 12, and for example, a package bag 100 stored in the storing conservation section 21a is absorbed or gripped and then supplied to the linear type conveyance unit 12 one by one (an empty bag supply step). This bag supply unit is provided preferably corresponding to each storing conservation section 21a, and in the example illustrated in Hg. 1, two bag supply units assigned respectively to two storing conservation section 21a are preferably provided.

The printing unit 22 is located adjacent to the linear type conveyance unit 12 in a printing processing station P12, which is provided on the downstream side from the empty bag storing unit 21 (empty bag supply processing station P11), and performs printing on an empty packaging bag 100 arranged in the printing processing station P12 by the linear type conveyance unit 12 (printing step). Here, the "downstream side" is based on the conveyance direction of a packaging bag 100. The specific device and printing method adopted in the printing unit 22 are not particularly limited. For instance, the printing unit 22 can print letters, symbols or pattern indicating various kinds of information, such as the manufacturing date, the expiration date, the manufacturing plant and the lot number, onto the front surface and/or the rear surface of a packaging bag 100, by means of an inkjet printing method or a laser printing method. In the example illustrated in FIG. 1, the printing unit 22 is provided on only one side of a packaging bag 100 conveyed by the linear type conveyance unit 12, and the printing process is performed onto the only one side of the packaging bag 100.

Note that, the printing units 22 may be provided at positions which sandwich a packaging bag 100 arranged in the printing processing station P12, and then the printing process may be performed onto both surfaces of the packaging bag 100. In particular, since the linear type conveyance unit 12 according to the present embodiment conveys a packaging bag 100 in a state where the front and rear surfaces of the packaging bag 100 are exposed, the printing process onto both surfaces of a packaging bag 100 can be performed very simply and conveniently. Further, in the example illustrated in FIG. 1, the printing unit 22 performs printing process simultaneously on two packaging bags 100 arranged side by side in the printing processing station P12.

The printing inspection unit 23 is disposed adjacent to the linear type conveyance unit 12 in a print inspection processing station P13 provided on the downstream side from the printing unit 22 (the printing processing station P12), inspects the quality of printing on an empty packaging bag 100 arranged in the print inspection processing station P13 (print inspection step). The specific device and inspection method adopted in the printing inspection unit 23 are not particularly limited. For instance, the printing inspection unit 23 can evaluate the presence or absence of printing in the packaging bag 100, the printing position and/or clarity of the printing so as to determine whether or not printing is proper. In the example illustrated in FIG. 1, the printing inspection unit 23 is provided on the only one side of a packaging bag 100 arranged in the print inspection processing station P13, and printing inspection is performed on the only one side of the packaging bag 100. Note that, the printing inspection units 23 may be disposed at positions which sandwich a packaging bag 100 arranged in the print inspection processing station P13, and the printing inspection process may be performed on both surfaces of the packaging bag 100. Further, in the example illustrated in FIG. 1, the printing inspection unit 23 performs printing inspection process simultaneously on two packaging bags 100 arranged side by side in the print inspection processing station P13.

The delivery unit 13 is provided so as to be able to move between a delivery processing station P14, which is provided on the downstream side from the printing inspection unit 23 (the print inspection processing station P13), and a print bag supply processing station P21. More specifically, the delivery unit 13 receives an empty packaging bag 100 from the linear type conveyance unit 12 at the delivery processing station P14, and delivers the packaging bag 100 to the rotary type conveyance unit 14 at the print bag supply processing station P21 (empty bag delivery process). As will be described later for the specific configuration of the delivery unit 13, in this embodiment, a packaging bag 100 supported by the delivery unit 13 is rotated by 90° in a third direction D3 after the packaging bag 100 is supplied to the delivery unit 13 from the linear type conveyance unit 12 and before the packaging bag 100 is supplied to the rotary type conveyance unit 14 from the delivery unit 13. Then, the delivery unit 13 is moved in the first direction D1 so as to approach the rotary type conveyance unit 14, and then the packaging bag 100 is supplied to the rotary type conveyance unit 14.

The rotary type conveyance unit 14 includes a disk-shaped rotary table 69 which is provided as a rotation body on the base 11, and a plurality of gripper pairs (i.e., fourth supporting units) 61 which are installed onto the periphery of the rotary table 69 and each support a packaging bag 100. The rotation center C of the rotary table 69 is positioned on an extended line of the linear conveyance track of a packaging bag 100 conveyed by the linear type conveyance unit 12.

The rotary type conveyance unit 14 illustrated in FIG. 1 is a double type unit (W-type unit) that performs the same processing onto two packaging bags 100 at the same time, two gripper pairs 61 constitute one unit gripper mechanism, and in total, eight unit gripper mechanisms are provided in a fixed manner at equal intervals in the peripheral portion of the rotary table 69. When the number of process steps of the second processing system is the same as the number of unit gripper mechanisms provided in the rotary type conveyance unit 14, the processes in the respective steps can be performed without incurring waste. Therefore, in the example shown in FIG. 1, the number of process steps of the second processing system and the number of unit gripper mechanisms provided in the rotary type conveyance unit 14 are both "eight (8)".

The conveyance path for a packaging bag 100 by means of the rotary type conveyance unit 14 is a circular path. A plurality of process stations are provided along the conveyance path at regular intervals, and in the example shown in FIG. 1, eight (8) process stations (i.e., P21 to P28) in all are serially provided. Various devices which perform processing on packaging bags 100 conveyed by the rotary type conveyance unit 14 and are included in the second processing system are installed in the respective stations. This second processing system includes a device performing a process which is preferably performed in a state where a packaging bag 100 remains opened, a device performing a process which needs opening a packaging bag 100, and a device performing a process required to be carried out after these processes. In the present embodiment, the second processing system includes a device performing a receiving step in the print bag supply processing P21, a device performing an opening step in the opening processing station P22, a device performing a solid feed step in the solid feed processing station P23, a device performing a liquid feed step in the liquid feed processing station P24, a device performing a blank processing step in the blank processing station P25, a device performing a first seal step in the first seal processing station P26, a device performing a second seal step in the second seal processing station P27, and a device performing a cooling discharge step in the cooling discharge station P28.

In the print bag supply processing station P21, a gripper pair 61 configured by two grippers is positioned, the both side edge portions of a packaging bag 100 delivered from the delivery unit 13 are gripped by the gripper pair 61. Since the packaging machine 10 illustrated in FIG. 1 is a double type (i.e., W-type) as mentioned above, two gripper pairs 61 are positioned in the print bag supply processing station P21, and two packaging bags 100 are simultaneously delivered to the two gripper pairs 61 from the delivery unit 13. Each gripper pair 61 is moved due to the rotation of the rotary table 69, and serially travels to the process stations P21 to P28 along the circular conveyance track.

In the opening processing station P22, an opening device (i.e., opening processing unit) 32 including absorption members 62 is positioned, and packaging bags 100 gripped by gripper pairs 61 are absorbed by the absorption members 62 so that the mouth of each packaging bag 100 is opened. In the solid feed processing station P23, a solid feeding device 33 including hoppers 63 having a shape of funnel is positioned, and solid contents are fed from the hoppers 63 into packaging bags 100 via the mouths being opened. Further, in the liquid feed processing station P24, a liquid feeling device 34 including feeding nozzles 64 is positioned, and liquid contents are fed from the feeding nozzles 64 into packaging bags 100.

In the present embodiment, the "content supply unit for feeding contents into a packaging bag 100 being opened" includes the solid feeding device 33 and the liquid feeling device 34 as described above; however, the configuration of the content supply unit is not limited to the configuration of the present embodiment. For instance, one of the solid feeding device 33 and the liquid feeling device 34 may be omitted, and other devices, such as a powder feeding device for feeding powder contents into a packaging bag 100 and air feeding device for feeding air into a packaging bag 100, may be provided as the content supply unit.

Further, at least "in the section from the opening processing station P22 to the liquid feed processing station P24", a packaging bag 100 is conveyed in a state where the opening state is kept. Therefore, for instance, the absorption member 62 may move together with a packaging bag 100 from the opening processing station P22 to the liquid feed processing station P24 (or to the solid feed processing station P23) while keeping the opening state of the packaging bag 100. Further, in a case where a packaging bag 100 has a configuration enabling the opening state to be kept without the aid of the absorption member 62 after the packaging bag 100 is once opened, the absorption member 62 does not need to move on to the solid feed processing station P23 and the liquid feed processing station P24, and may be provided only in the opening processing station P22.

In the blank processing station P25, although no special processing is performed, an arbitrary device may be provided.

A first sealing device 36 is provided in the first seal processing station P26, a second sealing device 37 is provided in the second seal processing station P27, and each of the first sealing device 36 and the second sealing device 37 performs heat sealing processing onto packaging bags 100 (seal step). When the first sealing device 36 performs pre-heating and temporary sealing of the sealing section of a packaging bag 100 and the second sealing device 37 performs processing of heat-sealing the packaging bag 100 securely, a sealed product bag of which the mouth is sealed can be manufactured. In the first seal processing station P26, the mouth closure step is performed in which the mouth section of a packaging bag 100 containing contents is pulled from both sides by a gripper pair 61 in such a manner that the packaging bag 100 is put in a state where the mouth is substantially closed, and after this mouth closure step, the above-described heat sealing processing is performed by the first sealing device 36.

In the cooling discharge station P28, a cooling release device 38 including a discharge conveyer 67 and a cooling discharge unit 68 is installed, and the cooling release device 38 performs cooling processing onto packaging bags 100 (in particular, onto the sealing sections) and discharge processing of the packaging bag 100 (product bag release step). The cooling release device 38 may include a defect bag discharge device (not shown) which evaluates the quality of packaging bags (product bags) 100, and then separates packaging bags (product bags) 100 having a poor quality from packaging bags (product bags) 100 having a good quality and discharges the packaging bags 100 having a poor quality.

The above-described packaging machine 10 illustrated in FIG. 1 is merely one example of an embodiment to which the present invention can be applied, and the present invention can be applied to packaging machines 10 based on other embodiments. For example, the present invention can be also applied to a single type packaging machine 10 that performs processing on one packaging bag 100 at one time during one intermittent stop at each of the above processing stations P11-P14 and P21-P28.

Next, the configuration of the linear type conveyance unit 12 and the delivery unit 13 is specifically described. In the following description, for facilitating understanding, one example of a single type of the linear type conveyance unit 12 and delivery unit 13 is described, but the following configuration can be also appropriately applied to a double type (i.e. W-type) packaging machine 10 (a linear type conveyance unit 12 and a delivery unit 13), a triple type packaging machine 10, a quadruple type packaging machine 10 and other type packaging machines 10.

Figure 2:
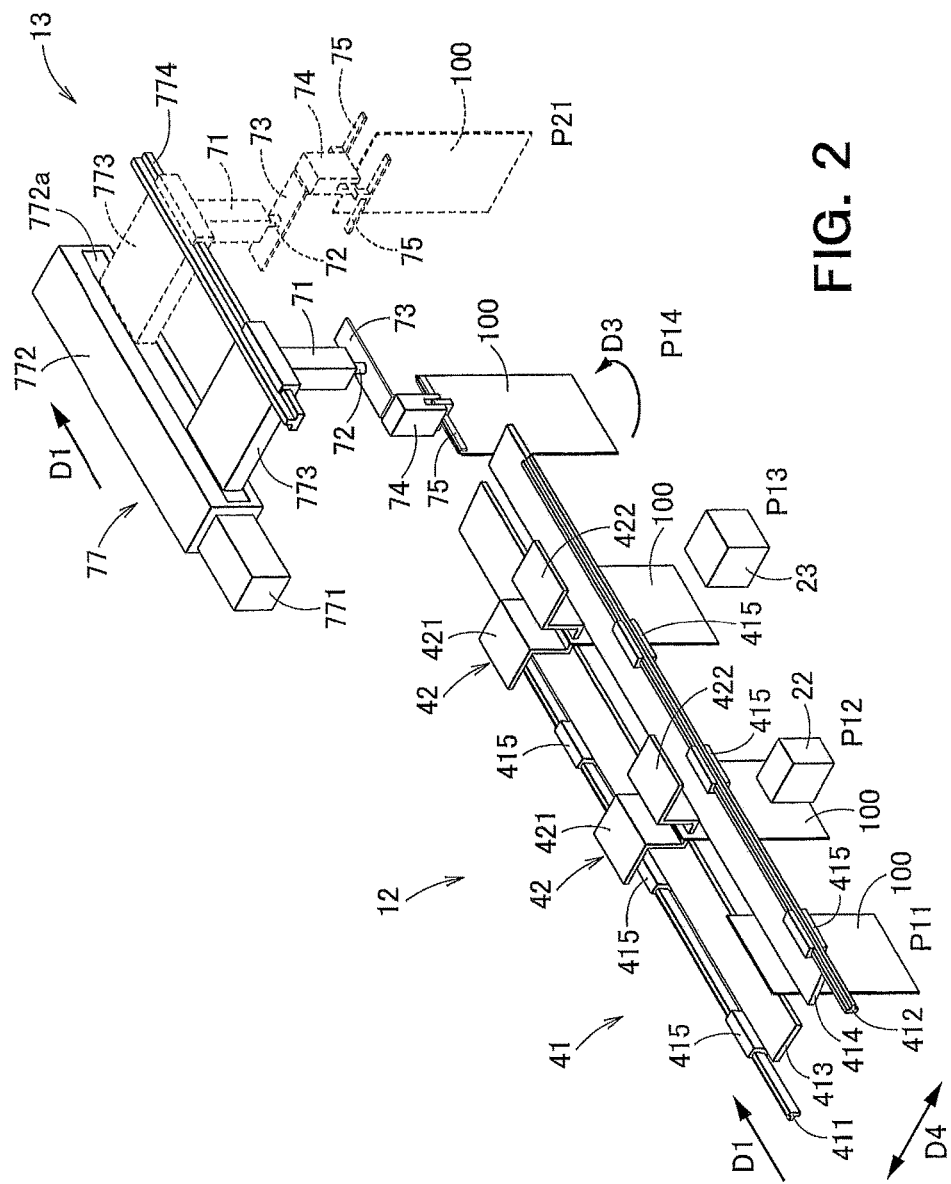
FIG. 2 is an oblique view illustrating a schematic configuration of a linear type conveyance unit and a delivery unit.

FIG. 2 is an oblique perspective view for illustrating an outline structure of the linear type conveyance unit 12 and the delivery unit 13. In FIG. 2, for convenience in description, elements included in the linear type conveyance unit 12 and the delivery unit 13 (in particular, in the linear type conveyance unit 12) are partially shown.

Since the linear type conveyance unit 12 and the delivery unit 13 of the present example are each the single type, one packaging bag 100 is arranged in each of the empty bag supply processing station P11, the printing processing station P12, the print inspection processing station P13, the delivery processing station P14 and the print bag supply processing station P21, and the processing is carried out onto one packaging bag 100 at each processing station.

First, the specific configuration of the linear type conveyance unit 12 is described. The linear type conveyance unit 12 includes a sliding support unit 41 (first supporting unit) and fixed support units 42 (second supporting units).

The sliding support unit 41 is configured to be capable of supporting packaging bags 100 being in a suspended state, and reciprocates in the first direction D1 between the below-descried first conveyance position (see FIGS. 2, 3 and 5) and the second conveyance position (see FIG. 6). The specific structure of the sliding support unit 41 is not limited in particular, and the sliding support unit 41 can be typically configured by a mechanism which can grip the upper part of empty packaging bags 100 in terms of the vertical direction in such a manner that the packaging bags 100 being in a suspended state are supported.

Supporting a packaging bag 100 being in a suspended state means supporting a packaging bag 100 using gravity so as to determine the posture of the packaging bag 100 in the vertical direction (i.e., the upper/lower direction). Typically, a packaging bag 100 can be supported in a suspended state by gripping the upper part of the packaging bag 100 in terms of the vertical direction (for example, the part of a packaging bag 100 which is upper than the center of gravity in the vertical direction) while releasing (not gripping) the lower part in terms of the vertical direction.

The sliding support unit 41 of the present example includes a first reciprocating supporting member 413 and a second reciprocating supporting member 414 which each extend in the first direction D1. Of the side sections of the first reciprocating supporting member 413 and the second reciprocating supporting member 414, the side section of the first reciprocating supporting member 413 and the side section of the second reciprocating supporting member 414 which opposite each other have each a planar shape and form supporting surfaces for sandwiching and supporting packaging bags 100. On the other hand, on each of the side section of the first reciprocating supporting member 413 and the side section of the second reciprocating supporting member 414 which face the opposite directions, a plurality of sliding supporting members 415 (in the example illustrated in FIG. 2, three sliding supporting members 415) are provided in a fixed manner.

The sliding supporting members 415 provided with the first reciprocating supporting member 413 are slidably attached to a first rail 411, and the sliding supporting members 415 provided with the second reciprocating supporting member 414 are slidably attached to a second rail 412. The first rail 411 and the second rail 412 are provided so as to be distant from each other in a fourth direction D4 perpendicular to the first direction D1, and extend in the direction D1 at least through the empty bag supply processing station P11, the printing processing station P12 and the print inspection processing station P13. The first rail 411 and the second rail 412 of the present example have a cross section of a protruding shape, and each of the sliding supporting members 415 slidably engages with the first rail 411 or the second rail 412 so as to sandwich the protruding part of the cross section of the first rail 411 or the second rail 412.

Each of the first reciprocating supporting member 413 and the second reciprocating supporting member 414 is provided so as to be capable of reciprocating not only in the first direction D1 but also the fourth direction D4 perpendicular to the first direction D1. The first reciprocating supporting member 413 and the second reciprocating supporting member 414 move towards each other in the fourth direction D4 so as to sandwich and grip packaging bags 100, and move away from each other so as to release the packaging bags 100. Furthermore, the first reciprocating supporting member 413 and the second reciprocating supporting member 414 are capable of moving in the forward direction of the first direction D1 while gripping packaging bags 100. Thus, by causing the first reciprocating supporting member 413 and the second reciprocating supporting member 414 to move in the first direction D1 in a state where they grip packaging bags 100, each packaging bag 100 is conveyed in the direction (i.e., the direction in which one side edge surface of each packaging bag 100 is oriented) perpendicular to the front/rear surface direction. Therefore, by combining the reciprocating movements of the first reciprocating supporting member 413 and the second reciprocating supporting member 414 in the first and fourth directions D1 and D4, packaging bags 100 are conveyed in the first direction D1 in a continuous manner.

In the present embodiment, the first reciprocating supporting member 413 and the second reciprocating supporting member 414 are arranged at the first conveyance position so at to extend through the empty bag supply processing station P11, the printing processing station P12 and the print inspection processing station P13, and are arranged at the second conveyance position so as to extend through the printing processing station P12, the print inspection processing station P13 and the delivery processing station P14. Thus, when the first reciprocating supporting member 413 and the second reciprocating supporting member 414 gripping packaging bags 100 move from the first conveyance position to the second conveyance position, the packaging bags 100 having been located at the empty bag supply processing station P11, the printing processing station P12 and the print inspection processing station P13 during the first conveyance position are located respectively at the printing processing station P12, the print inspection processing station P13 and the delivery processing station P14. Therefore, concerning the empty bag supply processing station P11, the printing processing station P12, the print inspection processing station P13 and the delivery processing station P14, the distances between adjacent processing stations are substantially equal to each other. Furthermore, the interval between the first conveyance position and the second conveyance position of the sliding support unit 41 is substantially equal to the distances between adjacent processing stations of these processing stations P11 to P14, and is a distance corresponding to one step of the intermittent conveyance of a packaging bag 100.

On the other hand, the fixed support units 42 receive packaging bags 100 from the sliding support unit 41 located at the second conveyance position (see FIG. 6), and then support the packaging bags 100 in a suspended state. The specific structure of the fixed support units 42 is not particularly limited. Each fixed support unit 42 can be typically configured by a mechanism which is capable of supporting a packaging bag 100 in a suspended state while gripping the upper part of the empty packaging bag 100 in terms of the vertical direction. Each fixed support unit 42 according to the present embodiment includes a first fixed supporting member 421 and a second fixed supporting member 422 which extend in the first direction D1 above the first and second reciprocating supporting members 413, 414 in terms of the vertical direction. Each of the first and second fixed supporting member 421, 422 is provided so as to be capable of reciprocating in the fourth direction D4 perpendicular to the first direction D1 but does not reciprocate in the first direction D1. Thus, concerning the fourth direction D4, the first and second fixed supporting members 421, 422 can move towards each other so as to sandwich and grip a packaging bag 100, and can move away from each other so as to release the grip of the packaging bag 100. The fixed support units 42 are provided at the printing processing station P12 and the print inspection processing station P13 respectively.

The fixed support units 42 provided in the printing processing station P12 and the print inspection processing station P13 respectively perform the above-described gripping action and grip release action so as to receive packaging bags 100 from the sliding support unit 41 and deliver the packaging bags 100 to the sliding support unit 41. Specifically, a pair of the first and second fixed supporting member 421, 422 constituting each fixed support unit 42 sandwiches and grips a packaging bag 100 gripped by the first and second reciprocating supporting member 413, 414 located at the second conveyance position, and retains the gripping state of the packaging bag 100 even after the grip of the packaging bag 100 by means of the first and second reciprocating supporting member 413, 414 is released. In this way, packaging bags 100 are delivered from the sliding support unit 41 to the fixed support units 42. Furthermore, the first and second fixed supporting member 421, 422 constituting a pair move away from each other in a state where a packaging bag 100 is gripped by the first and second reciprocating supporting member 413, 414 located in the first conveyance position, so as to release the grip of the packaging bag 100. In this way, packaging bags 100 are delivered from the fixed support units 42 to the sliding support unit 41.

Thus, packaging bags 100 are intermittently and continuously conveyed to the empty bag supply processing station P11, the printing processing station P12, the print inspection processing station P13 and the delivery processing station P14 by sequentially repeating "the step of causing the sliding support unit 41 located at the first conveyance position to grip packaging bags 100", "the step of causing the fixed support units 42 to release the grip of packaging bags 100", "the step of causing the sliding support unit 41 to move from the first conveyance position to the second conveyance position while the sliding support unit 41 maintains gripping the packaging bags 100", "the step of causing the fixed support units 42 to grip the packaging bags 100 gripped by the sliding support unit 41 located at the second conveyance position", "the step of causing the sliding support unit 41 located at the second conveyance position to release grip of the packaging bags 100 while the fixed support units 42 maintain gripping the packaging bags 100" and "the step of causing the sliding support unit 41 to move from the second conveyance position to the first conveyance position".

A packaging bag 100 arranged in the delivery processing station P14 by the sliding support unit 41 located at the second conveyance position is gripped by an opening/closing chuck 75 of the delivery unit 13. This opening/closing chuck 75 of the delivery unit 13 performs opening and closing actions similar to the first and second fixed supporting members 421, 422 of the fixed support units 42, so as to perform gripping and releasing the vertical direction upper part of the packaging bag 100 at the same timing as the fixed support units 42.

Next, the specific configuration of the delivery unit 13 is explained.

The delivery unit 13 according to the present embodiment includes: the opening/closing chuck (the third supporting unit) 75 for supporting a packaging bag 100 in a suspended state; and the delivery driving unit 77 for reciprocating the opening/closing chuck 75 between the delivery processing station (the third conveyance position) P14 and the print bag supply processing station (the fourth conveyance position) P21. The opening/closing chuck 75 is driven by an air chuck 74 so as to open and close, and the air chuck 74 is attached to an air cylinder 71 via a swing plate 73 and an air cylinder axis 72. These air cylinder 71, air cylinder axis 72, swing plate 73, air chuck 74 and opening/closing chuck 75 are configured in an integrated fashion, and when the air cylinder 71 is moved, the other components integrated with the air cylinder 71 are also moved in an integrated fashion.

The delivery driving unit 77 includes, in addition to the air cylinder 71, a delivery motor 771, a delivery box 772, a delivering supporting member 773 and a delivery guide rail 774. The delivering supporting member 773 is attached to the delivery motor 771 and slidably engages with the delivery guide rail 774 extending in the first direction D1. This delivery driving unit 77 horizontally rotates the opening/closing chuck 75 by the predetermined angle (in the present example, by 90°) after a packaging bag 100 is supplied from the linear type conveyance unit 12 to the opening/closing chuck 75 and before the packaging bag 100 is supplied from the opening/closing chuck 75 to the rotary type conveyance unit 14, while moving the opening/closing chuck 75 from the delivery processing station P14 to the print bag supply processing station P21. In FIG. 2, the elements depicted by solid lines, such as the delivering supporting member 773, the air cylinder 71, the air cylinder axis 72, the swing plate 73, the air chuck 74, the opening/closing chuck 75 and the packaging bag 100, show a state immediately after the packaging bag 100 is delivered from the linear type conveyance unit 12 to the delivery unit 13 at the delivery processing station P14, and these elements depicted by dotted lines show a state immediately before the packaging bag 100 is delivered from the delivery unit 13 to the rotary type conveyance unit 14 at the print bag supply processing station P21.

The rotation actions of the opening/closing chuck 75 are performed by using the air cylinder 71 as the driving source and rotating the air cylinder axis 72, the swing plate 73, the air chuck 74 and the opening/closing chuck 75 by means of the air cylinder 71. The conveyance of the opening/closing chuck 75 from the delivery processing station P14 to the print bag supply processing station P21 is performed by using the delivery motor 771 as the driving source and guiding the delivering supporting member 773 along the delivery box 772 and the delivery guide rail 774. Specifically, the delivering supporting member 773 is provided so as to be capable of sliding along "the guide slit 772a which is formed in the delivery box 772 and extends in the first direction D1" and "the delivery guide rail 774 extending in the first direction D1". When rotary drive force of the delivery motor 771 is transmitted to the delivering supporting member 773 via a force transmitting member (not illustrated), such as a ball screw, provided inside the delivery box 772, the delivering supporting member 773 and the air cylinder 71 reciprocate in the first direction D1.

The air cylinder 71, the delivery motor 771 and the air chuck 74 are connected to a controller (not illustrated), and are controlled by the controller in an integrated manner.

For example, the air cylinder 71 is controlled by the controller (not illustrated) in such a manner that the air fed into the air cylinder 71 is adjusted so as to adjust the rotation direction and the rotation angle of the air cylinder axis 72, so that the orientation of the opening/closing chuck 75 and a packaging bag 100 gripped by the opening/closing chuck 75 is changed. In the present embodiment, when the air cylinder axis 72 is rotated in the forward direction of the third direction D3 by 90° by means of the air cylinder 71 in a state where the directions in which the front and rear surfaces of a packaging bag 100 gripped by the opening/closing chuck 75 face (i.e., the opening/closing directions of the opening/closing chuck 75) are perpendicular to the first direction D1, then the opening and closing directions of the opening/closing chuck 75 correspond with the first direction D1. Furthermore, by causing the air cylinder 71 to rotate the air cylinder axis 72 in the reverse direction of the third direction D3 by 90°, the opening/closing directions of the opening/closing chuck 75 become the direction (i.e., fourth direction D4) perpendicular to the first direction D1. The rotation of the air cylinder axis 72 (the opening/closing chuck 75) caused by the air cylinder 71 can be performed during at least one of the period when the opening/closing chuck 75 is located in the delivery processing station P14, the period when the opening/closing chuck 75 is located in the print bag supply processing station P21 and the period when the opening/closing chuck 75 is being conveyed between the delivery processing station P14 and the print bag supply processing station P21.

The delivery motor 771 is controlled by the controller (not illustrated) so that the rotation speed and/or the rotation amount of the delivery motor 771 are adjusted. With this, regarding the first direction D1, the position of the delivering supporting member 773 and the positions of the air cylinder 71, the air cylinder axis 72, the swing plate 73, the air chuck 74 and the opening/closing chuck 75 which are attached to the delivering supporting member 773 in a fixed manner, are changed. In the present embodiment, when the delivery motor 771 moves the delivering supporting member 773 via the force transmitting member such as a ball screw, the opening/closing chuck 75 is moved between the delivery processing station P14 and the print bag supply processing station P21.

Further, the air chuck 74 is controlled by the controller (not illustrated) so as to adjust opening and closing of the opening/closing chuck 75, so that grip and release of a packaging bag 100 by and from the opening/closing chuck 75 are performed. In the present embodiment, by causing the opening/closing chuck 75 located in the delivery processing station P14 to be closed by the air chuck 74 in a state where a packaging bag 100 being gripped by the sliding support unit 41 is located in the delivery processing station P14, the packaging bag 100 is delivered from the sliding support unit 41 to the opening/closing chuck 75. On the other hand, by causing a gripper pair 61 (see FIG. 1) attached to the rotary table 69 to grip the packaging bag 100 in a state where the packaging bag 100 being gripped by the opening/closing chuck 75 is located in the print bag supply processing station P21 and causing the opening/closing chuck 75 to be opened, the packaging bag 100 is delivered from the opening/closing chuck 75 to the gripper pair 61.

The driving of the air cylinder 71, the delivery motor 771 and the air chuck 74 and the driving of other devices such as the linear type conveyance unit 12, the rotary type conveyance unit 14 and the first and second processing systems as described above, are controlled by the controller (not illustrated) and are mutually correlated. Thus, for example, the opening/closing chuck 75 can properly receive a packaging bag 100 from the linear type conveyance unit 12 at the delivery processing station P14, and can properly deliver the packaging bag 100 to the rotary type conveyance unit 14 at the print bag supply processing station P21. The specific structure of this controller is not particularly limited, and the controller may be configured by combining a plurality of sub-controllers, and a single controller may comprehensively control devices constituting the packaging machine 10. In the present embodiment, the controller is provided inside a control box 16 (see FIG. 1) provided below the delivery unit 13.

The linear type conveyance unit 12, the delivery unit 13 and the controller (not illustrated) having the above-described structure according to the present embodiment have a function to convey packaging bags 100, and can also function as a discharge unit to discharge packaging bags 100 having a defect on the basis of the inspection results of the printing inspection unit 23. For example, when a packaging bag 100 that has been judged as a defect bag by the printing inspection unit 23 is disposed in the delivery processing station P14, the controller controls the air chuck 74 so that the opening/closing chuck 75 does not grip the packaging bag 100 according to the inspection results sent from the printing inspection unit 23. On the other hand, the sliding support unit 41 (the first and second reciprocating supporting members 413, 414) is controlled so that the grip of the packaging bag 100 using the sliding support unit 41 is released. In this way, a packaging bag 100 that has been judged as a defect bag by the printing inspection unit 23 falls at the delivery processing station P14 and is discharged from the conveyance path of the delivery unit 13 and the rotary type conveyance unit 14. Packaging bags 100 discharged at the delivery processing station P14 are guided by a guide member (not illustrated) and gathered into a predetermined accumulation place. A user may reset reusable packaging bags 100 among the packaging bags 100 gathered into the accumulation place, onto the empty bag storing unit 21 (see FIG. 1), which enables the effective utilization of packaging bags 100.

Next, the more specific structure and operation method of the linear type conveyance unit 12 are described.

Figure 3:
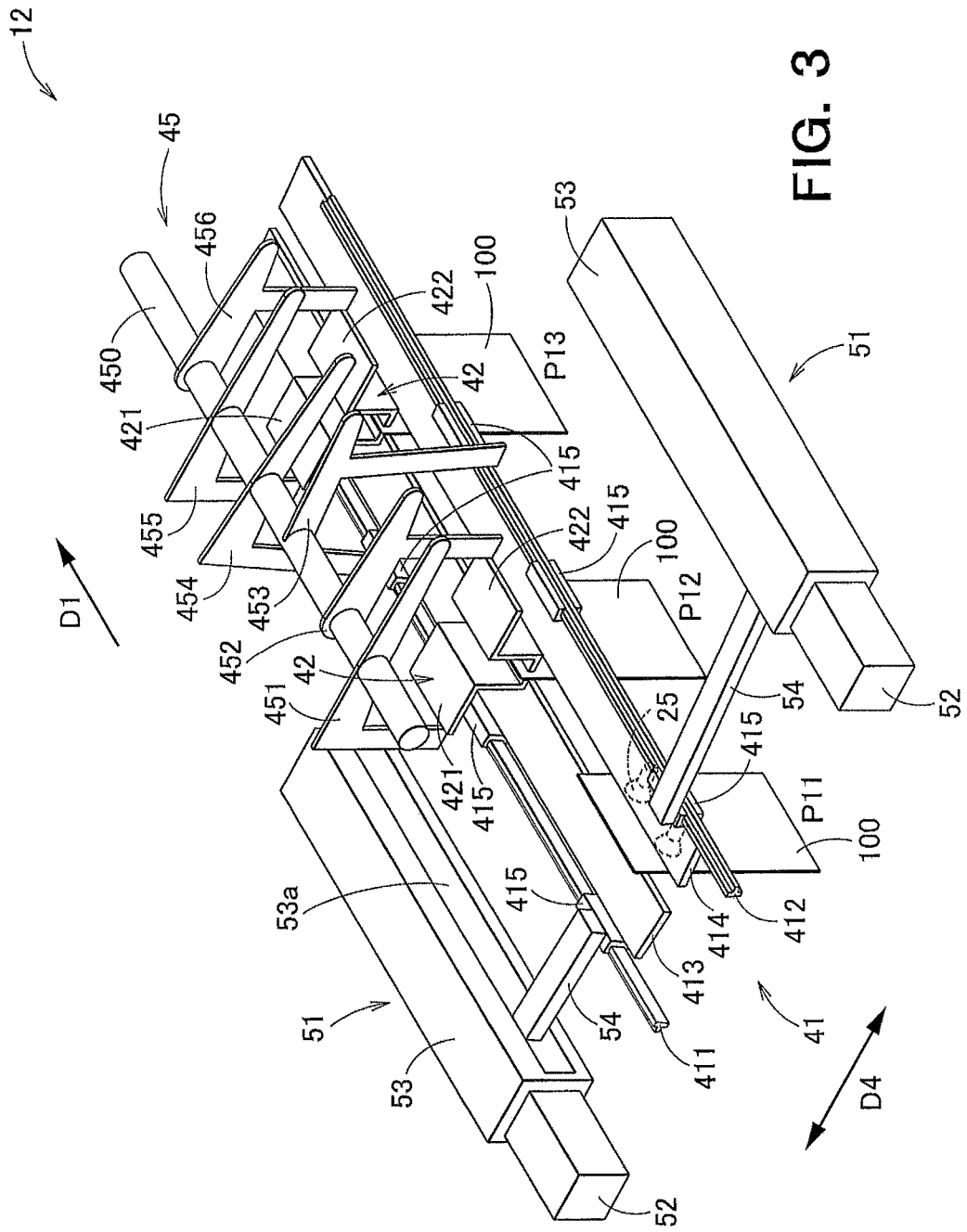
FIG. 3 is an oblique view showing a configuration example of the linear type conveyance unit.

FIG. 3 is an oblique perspective view illustrating a structural example of the linear type conveyance unit 12. For convenience of explanation, FIG. 3 partially illustrates elements constituting the linear type conveyance unit 12.

The general construction of the linear type conveyance unit 12 is explained above with reference to FIG. 2, and the linear type conveyance unit 12 according to the present embodiment includes a pair of slide mechanisms 51 for reciprocating the sliding support unit 41 in the first direction D1, and a support adjustment unit 45 for reciprocating the sliding support unit 41 and the fixed support units 42 in the fourth direction D4.

The pair of slide mechanisms 51 includes a slide mechanism 51 for reciprocating the first reciprocating supporting member 413 in the first direction D1, and a slide mechanism 51 for reciprocating the second reciprocating supporting member 414 in the first direction D1. Each slide mechanism 51 includes a slide motor 52 which is controlled by the controller (not illustrated) to serve as a driving source, and a slide plate 54 which is connected to the slide motor 52 via a force transmitting member (not illustrated) provided inside a slide box 53. Each slide plate 54 is provided so as to be able to slide along "a slide slit 53a which is formed in the slide box 53 and extends in the first direction D1", and has one end attached to one sliding supporting unit 415 in a fixed manner. By transmitting the rotary driving force of the slide motor 52 to the slide plate 54 via the force transmitting member (not illustrated) such as a ball screw provided inside the slide box 53, the slide plate 54 and the first or second reciprocating supporting member 413, 414 attached to the slide plate 54 via the sliding supporting unit 415 reciprocate in the first direction D1.

Displacement absorption mechanisms (not illustrated) for absorbing the tilt of the slide plates 54 and the fluctuation of the relative distance of the slide plates 54 with respect to the slide boxes 53 are provided inside the slide boxes 53, and the displacement absorption mechanisms can be suitably configured by using a rod end bearing for example. The first rail 411 and the second rail 412 are provided so as to be capable of reciprocating in the fourth direction D4 as described below, and the tilt of the slide plates 54 and the relative distance of the slide plates 54 with respect to the slide boxes 53 change according to the displacement in the fourth direction D4 of the first rail 411 and the second rail 412. Therefore, the displacement absorption mechanisms are provided so that the displacement of the slide plates 54 associated with the movement of the first rail 411 and the second rail 412 does not affect the function of the slide mechanisms 51. By providing the displacement absorption mechanisms, the slide plates 54, the sliding supporting members 415 and the first and second reciprocating supporting members 413, 414 can be moved to a proper position by the slide mechanisms 51 regardless of the positions of the first rail 411 and the second rail 412.

On the other hand, the support adjustment unit 45 includes a support base 450 extending in the first direction D1, and first to sixth swing levers 451-456 supported swingably by the support base 450. The first swing lever 451 is attached in a fixed manner to the first fixed supporting member 421 located in the printing processing station P12, and the second swing lever 452 is attached in a fixed manner to the second fixed supporting member 422 located in the printing processing station P12. The third swing lever 453 is attached to the second rail 412 in a fixed manner, and the fourth swing lever 454 is attached to the first rail 411 in a fixed manner. In particular, in the present example, the third swing lever 453 is attached to the leading end surface of the section protruding part of the second rail 412, and the fourth swing lever 454 is attached to the leading end surface of the section protruding part of the first rail 411. Thus, the sliding supporting members 415 can slide smoothly on the first rail 411 and the second rail 412 without interfering with the third and fourth swing levers 453, 454. The fifth swing lever 455 is attached in a fixed manner to the first fixed supporting member 421 located in the print inspection processing station P13, and the sixth swing lever 456 is attached in a fixed manner to the second fixed supporting member 422 located in the print inspection processing station P13.

The reciprocating movements of the sliding support unit 41 and the fixed support unit 42 in the fourth direction D4 are performed by causing the first to sixth swing levers 451-456 to swing around the support base 450.

Figure 4A:
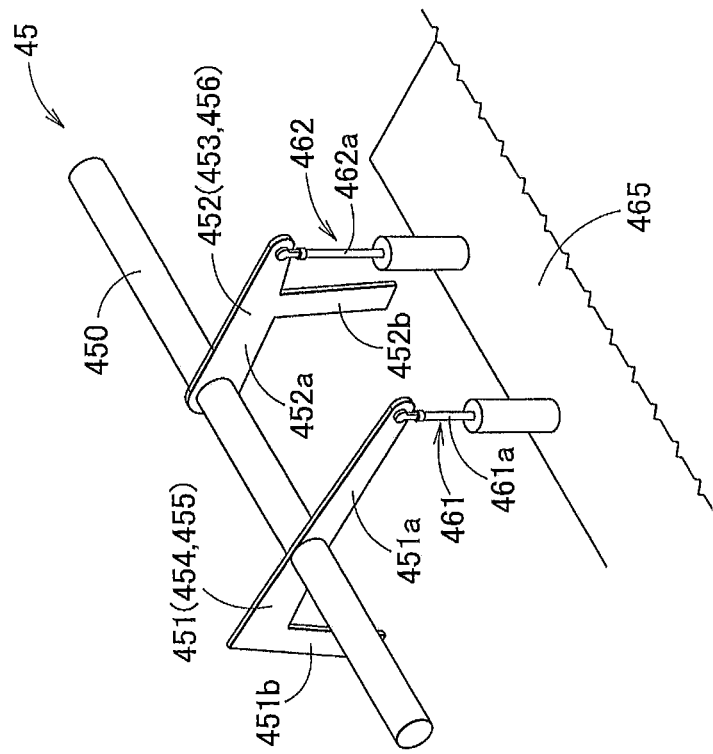
FIG. 4A is an oblique view illustrating an opening and closing behavior of a support adjustment unit, in particular, illustrating a closed state.
Figure 4B:
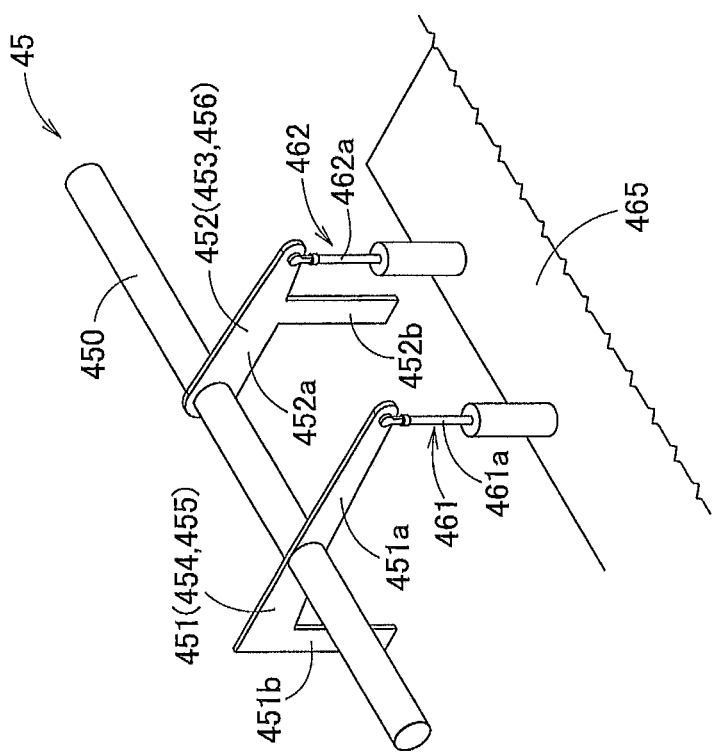
FIG. 4B is an oblique view illustrating the opening and closing behavior of the support adjustment unit, in particular, illustrating an open state.

FIGS. 4A and 4B are oblique perspective views illustrating opening and closing actions using the support adjustment unit 45, FIG. 4A showing a closed state, FIG. 4B showing an open state. In order to facilitate understanding, FIGS. 4A and 4B mainly illustrate only the support base 450, the first swing lever 451 and the second swing lever 452 of the support adjustment unit 45. For convenience to explain, the first swing lever 451 and the second swing lever 452 are explained below with reference to FIGS. 4A and 4B; however, the fourth swing lever 454 and the fifth swing lever 455 have a swing mechanism similar to the first swing lever 451, the third swing lever 453 and the sixth swing lever 456 have a swing mechanism similar to the second swing lever 452, and a first lifting mechanism 461 or a second lifting mechanism 462 described below is assigned to each of the first to sixth swing levers 451-456.

The first swing lever 451 has a L-shape, and includes a first swing force receiver 451a attached swingably to the support base 450, and a first branch section 451b extending from the first swing force receiver 451a downward in the vertical direction. An intermediate portion of the first swing force receiver 451a is attached swingably to the support base 450, the first branch section 451b extends from one end of the first swing force receiver 451a, and the first lifting mechanism 461 placed on a table 465 is connected to the other end of the first swing force receiver 451a. The first lifting mechanism 461 has a first lift section 461a moving up and down in the vertical direction, and the leading end of the first lift section 461a is connected rotatably to the first swing force receiver 451a. Thus, when the first lift section 461a increases in length and the other end of the first swing force receiver 451a receives a force upward in the vertical direction, the first branch section 451b rotates downward in the vertical direction around the support base 450, and the first fixed supporting member 421 attached to the first branch section 451b moves in the closed direction. On the other hand, when the first lift section 461a shortens and the other end of the first swing force receiver 451a receives force downward in the vertical direction, the first branch section 451b rotates upward in the vertical direction around the support base 450, and the first fixed supporting member 421 attached to the first branch section 451b moves in the open direction. The contact surface of the first lift section 461a with respect to the first swing force receiver 451a is always in contact with the first swing force receiver 451a regardless of the expansion and contraction state of the first lift section 461a.

On the other hand, the second swing lever 452 has a T-shape, and includes a second swing force receiver 452a attached swingably to the support base 450, and a second branch section 452b extending from the second swing force receiver 452a downward in the vertical direction. One end of the second swing force receiver 452a is attached swingably to the support base 450, the second branch section 452b extends from an intermediate portion of the second swing force receiver 452a, and the second lifting mechanism 462 placed on a table 465 is connected to the other end of the second swing force receiver 452a. The second lifting mechanism 462 has a second lift section 462a moving up and down in the vertical direction, and the leading end of the second lift section 462a is connected rotatably to the second swing force receiver 452a. Thus, when the second lift section 462a increases in length and the other end of the second swing force receiver 452a receives a force upward in the vertical direction, the second branch section 452b rotates upward in the vertical direction around the support base 450, and the second fixed supporting member 422 attached to the second branch section 452b moves in the open direction. On the other hand, when the second lift section 462a shortens and the other end of the second swing force receiver 452a receives force downward in the vertical direction, the second branch section 452b rotates downward in the vertical direction around the support base 450, and the second fixed supporting member 422 attached to the second branch section 452b moves in the closed direction. The contact surface of the second lift section 462a with respect to the second swing force receiver 452a is always in contact with the second swing force receiver 452a regardless of the expansion and contraction state of the second lift section 462a.

In order to cause the sliding support unit 41 and the fixed support units 42 to be moved by the support adjustment unit 45 having the above structure and perform the opening and closing actions, the expansion/contraction direction of the first lift sections 461a and the expansion/contraction direction of the second lift sections 462a are set to be opposite from each other. Thus, the first swing lever 451, the fourth swing lever 454 and the fifth swing lever 455 which each have a L-shape and are connected to the first lift sections 461a, and the second swing lever 452, the third swing lever 453 and the sixth swing lever 456 which each have a T-shape and are connected to the second lift sections 462a, are swung in a symmetric fashion.

For example, in order to perform the opening action of the sliding support unit 41 (i.e., the first rail 411, the second rail 412, the first reciprocating supporting member 413 and the second reciprocating supporting member 414), the first lift section 461a connected to the fourth swing lever 454 having a L-shape is shortened and the second lift section 462a connected to the third swing lever 453 having a T-shape is expanded (see FIG. 4B). By this means, "the first rail 411 attached in a fixed manner to the fourth swing lever 454, and the first reciprocating supporting member 413" and "the second rail 412 attached in a fixed manner to the third swing lever 453, and the second reciprocating supporting member 414" move in the directions which are away from each other, and the interval between the first reciprocating supporting member 413 and the second reciprocating supporting member 414 is enlarged in the fourth direction D4. On the other hand, the closing action of the sliding support unit 41 is performed by expanding the first lift section 461a connected to the fourth swing lever 454 and shortening the second lift section 462a connected to the third swing lever 453 (see FIG. 4A).

Similarly, in order to perform the opening action of each fixed support unit 42, the first lift sections 461a connected to the first swing lever 451 and the fifth swing lever 455 having a L-shape are shortened, and the second lift sections 462a connected to the second swing lever 452 and the sixth swing lever 456 having a T-shape are expanded (see FIG. 4B). By this means, "the first fixed supporting members 421 attached in a fixed manner to the first swing lever 451 and the fifth swing lever 455" and "the second fixed supporting members 422 attached in a fixed manner to the second swing lever 452 and the sixth swing lever 456" move in the directions which are away from each other, and each fixed support unit 42 is opened in the fourth direction D4. On the other hand, the closing action of each fixed support unit 42 is performed by expanding the first lift sections 461a connected to the first swing lever 451 and the fifth swing lever 455 and shortening the second lift sections 462a connected to the second swing lever 452 and the sixth swing lever 456 (see FIG. 4A).

The first lifting mechanisms 461 and the second lifting mechanisms 462 serving as driving sources for the opening and closing actions of the sliding support unit 41 and the fixed support units 42 may be configured by air cylinders, for example, but may be configured by other arbitrary mechanisms. Furthermore, the first lifting mechanism 461 and the second lifting mechanism 462 may be connected to the controller (not illustrated), and the amount of expansion and contraction of the first lift sections 461a and the second lift sections 462a may be adjusted by the controller.

Next, a conveyance example of packaging bags 100 carried out by the linear type conveyance unit 12 described above is explained with reference to FIGS. 3, 5 and 6.

Figure 5:
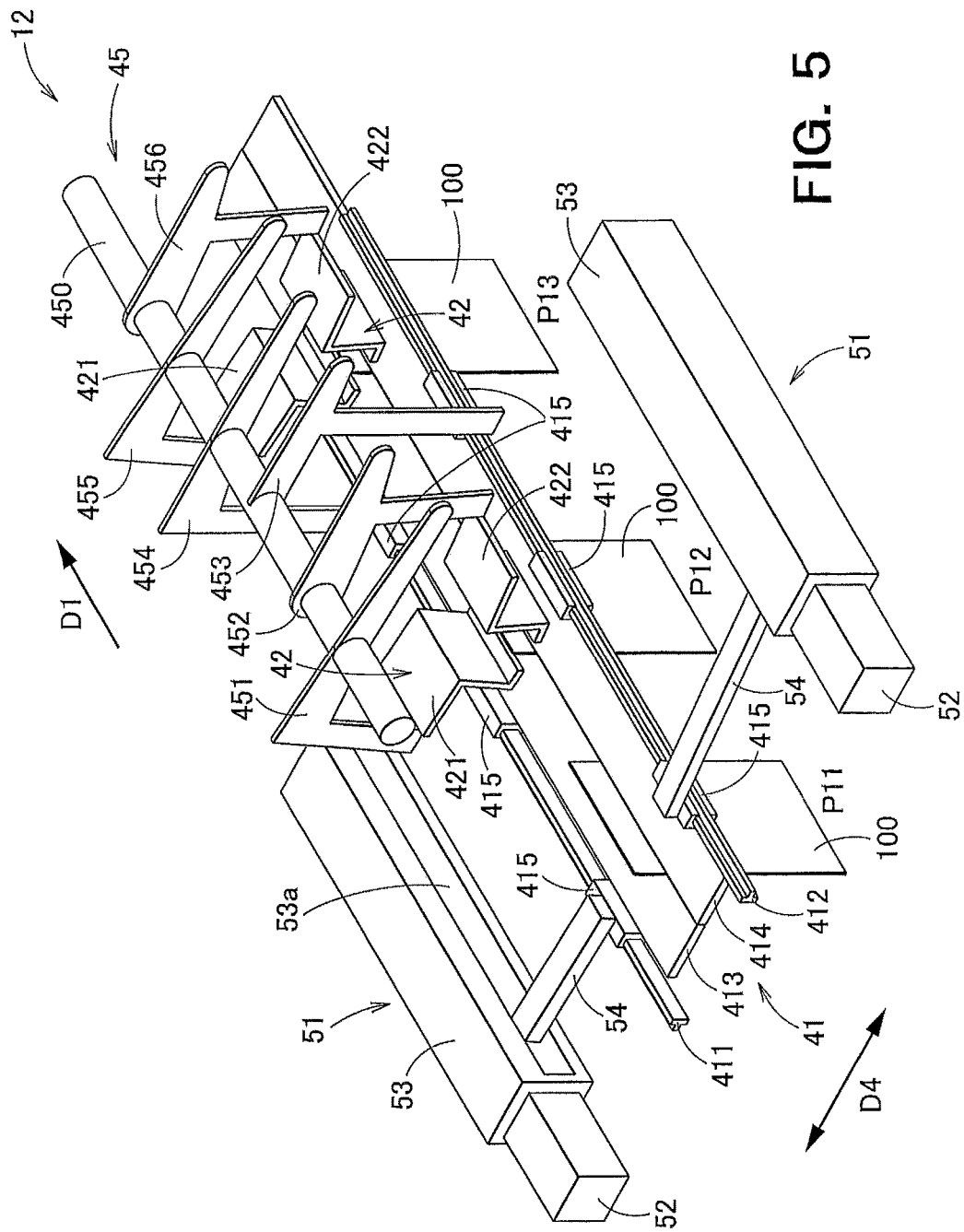
FIG. 5 is an oblique view of the linear type conveyance unit and illustrates a state where a sliding support unit is located at a first conveyance position.

FIG. 5 is an oblique perspective view of the linear type conveyance unit 12, showing a state where the sliding support unit 41 is disposed in the first conveyance position. FIG. 6 is an oblique perspective view of the linear type conveyance unit 12, showing a state where the sliding support unit 41 is disposed in the second conveyance position.

As described above, in the present embodiment, packaging bags 100 which have been taken from the empty bag storing unit 21 (see FIG. 1) one by one are conveyed in turn to the empty bag supply processing station P11, the printing processing station P12, the print inspection processing station P13 and the delivery processing station P14. In the example illustrated in FIG. 3, the bag supply unit 25 is moved from the position for absorbing and retaining a packaging bag 100 stored in the storing conservation section 21a of the empty bag storing unit 21, to the position for placing the absorbed and retained packaging bag 100 between the first reciprocating supporting member 413 and the second reciprocating supporting member 414, so that the packaging bag 100 is supplied to the linear type conveyance unit 12. When a packaging bag 100 to be processed is arranged in the empty bag supply processing station P11 in this way, the sliding support unit 41 is in an open state while being disposed in the first conveyance position, and the packaging bag 100 is arranged between the first reciprocating supporting member 413 and the second reciprocating supporting member 414 in such a manner that one of the front and rear surfaces of the packaging bag 100 faces toward the first reciprocating supporting member 413 side and the other faces toward the second reciprocating supporting member 414 side (see FIG. 3).

After a package bag 100 is positioned in the empty bag supply processing station P11, the first lifting mechanism 461 and the second lifting mechanism 462 (see FIG. 4) are controlled in such a manner that the third swing lever 453 and the fourth swing lever 454 perform the closing action so that the packaging bag 100 is sandwiched by the first reciprocating supporting member 413 and the second reciprocating supporting member 414 (see FIG. 5). At that time, the first reciprocating supporting member 413 and the second reciprocating supporting member 41 sandwich and support not only a packaging bag 100 arranged in the empty bag supply processing station P11 but also packaging bags 100 arranged in the printing processing station P12 and the print inspection processing station P13 respectively.

Then, the first lifting mechanisms 461 and the second lifting mechanisms 462 (see FIG. 4) are controlled in a state where packaging bags 100 are supported by the sliding support unit 41 (the first reciprocating supporting member 413 and the second reciprocating supporting member 414) arranged in the first conveyance position in such a manner that the first swing lever 451, the second swing lever 452, the fifth swing lever 455 and the sixth swing lever 456 perform the opening action, so that the fixed support units 42 positioned in the printing processing station P12 and the print inspection processing station P13 perform the opening action so as to release the grip of the packaging bags 100 (see FIG. 5).

Figure 6:
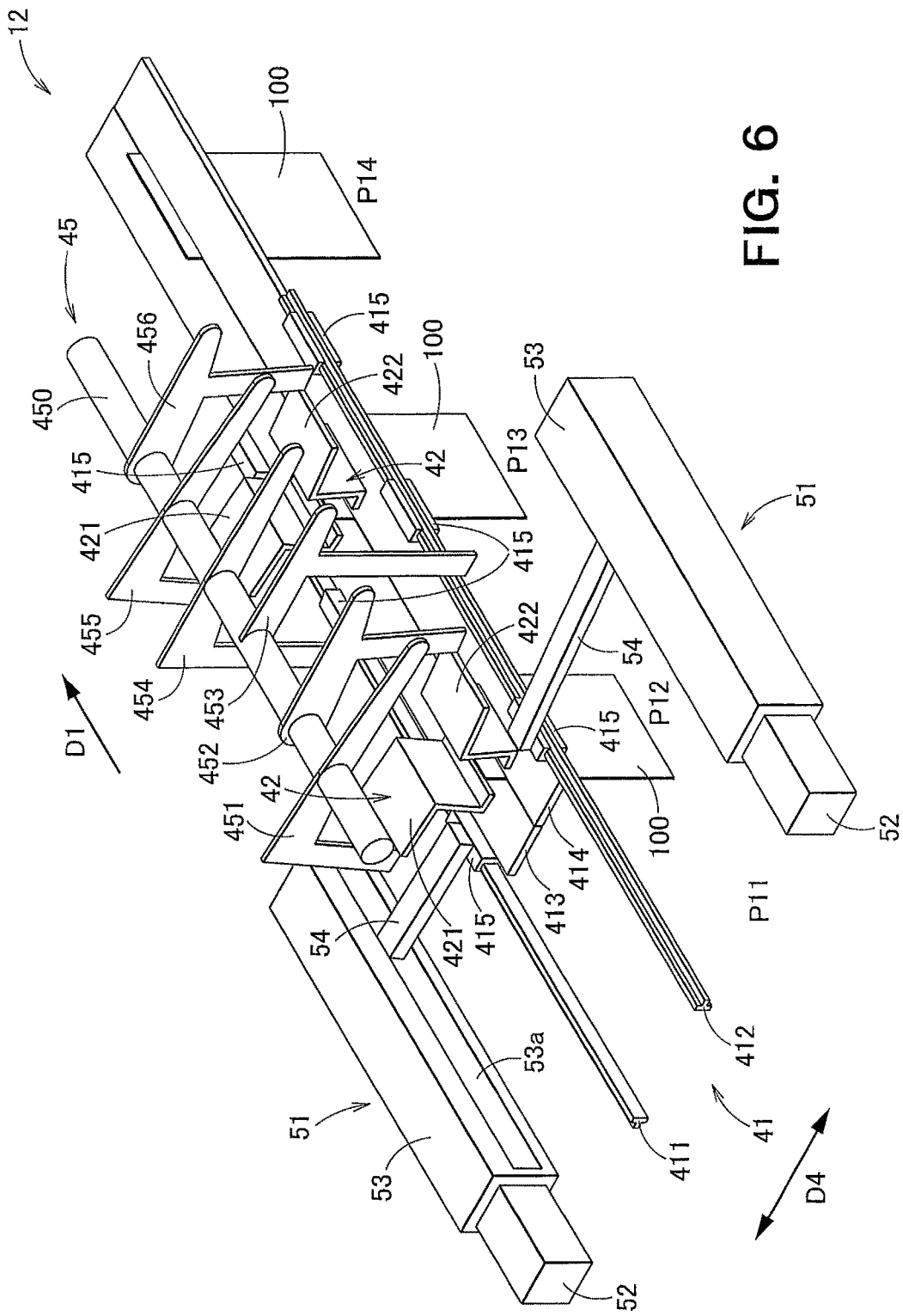
FIG. 6 is an oblique view of the linear type conveyance unit and illustrates a state where the sliding support unit is located at a second conveyance position.

Then, the slide mechanisms 51 move the sliding support unit 41 (the first reciprocating supporting member 413 and the second reciprocating supporting member 414) from the first conveyance position to the second conveyance position (see FIG. 6). As a result, the packaging bags 100 which have been positioned in the empty bag supply processing station P11, the printing processing station P12 and the print inspection processing station P13 are newly positioned in the printing processing station P12, the print inspection processing station P13 and the delivery processing station P14 respectively.

Then, the first lifting mechanisms 461 and the second lifting mechanisms 462 (see FIG. 4) are controlled so that the first swing lever 451, the second swing lever 452, the fifth swing lever 455 and the sixth swing lever 456 perform the closing action in a state where the packaging bags 100 are supported by the sliding support unit 41 (the first reciprocating supporting member 413 and the second reciprocating supporting member 414) arranged in the second conveyance position. As a result, the fixed support units 42 positioned in the printing processing station P12 and the print inspection processing station P13 perform the closing action and grip the packaging bags 100. Then, the first lifting mechanism 461 and the second lifting mechanism 462 (see FIG. 4) are controlled in such a manner that the third swing lever 453 and the fourth swing lever 454 perform the opening action in a state where the packaging bags 100 are supported by the respective fixed support units 42, so that the sliding support unit 41 releases the grip of the packaging bags 100.

Then, the slide mechanisms 51 move the sliding support unit 41 (the first reciprocating supporting member 413 and the second reciprocating supporting member 414) from the second conveyance position to the first conveyance position, and the bag supply unit 25 takes a new packaging bag 100 from the empty bag storing unit 21 and disposes the new packaging bag 100 in the empty bag supply processing station P11 (see FIG. 3).

By causing the linear type conveyance unit 12 to repeat a series of the conveyance steps described above, packaging bags 100 are intermittently conveyed in turn to the empty bag supply processing station P11, and the printing processing station P12, the print inspection processing station P13 and the delivery processing station P14.

As described above, according to the present embodiment, the processing which is carried out by the first processing system and is performed on packaging bags 100 conveyed linearly by the linear type conveyance unit 12, and the processing which is carried out by the second processing system and is performed on packaging bags 100 conveyed rotationally by the rotary type conveyance unit 14, are separately carried out while the delivery unit 13 is disposed therebetween. Therefore, the first processing system can perform the processing without being affected by the processing of the second processing system. Thus, when the processes which are performed in a state where the mouth of a packaging bag 100 is closed are carried out by the first processing system and the processes which are performed in a state where the mouth of a packaging bag 100 is open are carried out by the second processing system, these processes can be sequentially performed with ease and precision. In the present embodiment, the printing process and the printing inspection process on packaging bags 100 are performed during the linear conveyance, and the content feeding process into a packaging bag 100 is performed during the rotational conveyance. By performing the printing process and printing inspection process during the linear conveyance prior to the rotational conveyance in this way, the printing process and printing inspection process are accurately performed without being affected by the content feeding process performed during the rotational conveyance.

Furthermore, by positioning precision equipment, such as the printing unit 22 and the printing inspection unit 23, which is relatively breakable during machine washing intensively in the vicinity of the conveyance path of the linear type conveyance unit 12 so as to ensure a zone where the machine washing is not needed, precision equipment which is weak in water can be properly used without concern for liquid splash during the washing and contents feeding.

Furthermore, according to the present embodiment, in the first processing system, each process is carried out in a state where the mouth of a packaging bag 100 is not opened, and in the second processing system, processes are carried out in a state where the mouth of a packaging bag 100 is opened. Specifically, when the packaging processes before opening the mouth of a packaging bag 100 are performed during the conveyance process caused by the linear type conveyance unit 12, the linear type conveyance unit 12 can convey empty packaging bags 100 without need for opening the mouth of the packaging bags 100. By conveying each packaging bag 100 without opening the mouth in this way, the posture of each packaging bag 100 during the conveyance can be stable, and there is no need to provide a guide for stabilizing the posture of a packaging bag 100 in the linear type conveyance unit 12. In particular, the process for feeding the contents into a packaging bag 100 is performed during the rotation conveyance caused by the rotary type conveyance unit 14 provided in the later stage, and therefore, each packaging bag 100 conveyed by the linear type conveyance unit 12 is very light. Therefore, a chance of unintentional displacement of grip of a package bag 100 during the conveyance by the linear type conveyance unit 12 is very low, and the gripping shift of a packaging bag 100 between the sliding support unit 41 and the fixed support unit 42 can be accurately carried out without difficulty, so that the linear type conveyance unit 12 can stably convey packaging bags 100.

Furthermore, the gripping shift of a packaging bag 100 is performed by the linear type conveyance unit 12 and the delivery unit 13 which each handle empty packaging bags 100, but is not basically performed during the conveyance by the rotary type conveyance unit 14 which may handle packaging bags 100 containing contents. Basically, in a case where the gripping shift of an empty packaging bag 100 is carried out, any part of the empty packaging bag 100 may be gripped, without taking the impact on the contents into consideration. Therefore, according to the packaging machine 10 of the present embodiment, there is no need to secure a grip space only for the gripping shift in a packaging bag 100, and even if packaging bags 100 used are compact, product bags can be manufactured with high accuracy.

Furthermore, according to the packaging machine 10 of the present embodiment, there is no need to use a chain as a mechanism for moving the gripper pairs 61, and therefore there is no need to worry about the influence of the stretch of such a chain over time.

Furthermore, since the linear type conveyance unit 12 conveys a packaging bag 100 in turn while retaining the packaging bag 100 in a suspended state where the mouth of the packaging bag 100 faces upward, both of the front and rear surfaces of the packaging bag 100 are exposed, and therefore various types of processes, such as the printing process and the printing inspection process, can be easily performed on the front and rear surfaces.

Furthermore, when the linear type conveyance unit 12 and the delivery unit 13 constitute the discharge unit for discharging packaging bags 100 having printing defects, the type of defect factor of a packaging bag 100 to be discharged by the discharge unit can be limited, and therefore there is no need to select reusable packaging bags 100 or the workload for such selection can be reduced.

[First Variation]

Figure 7:
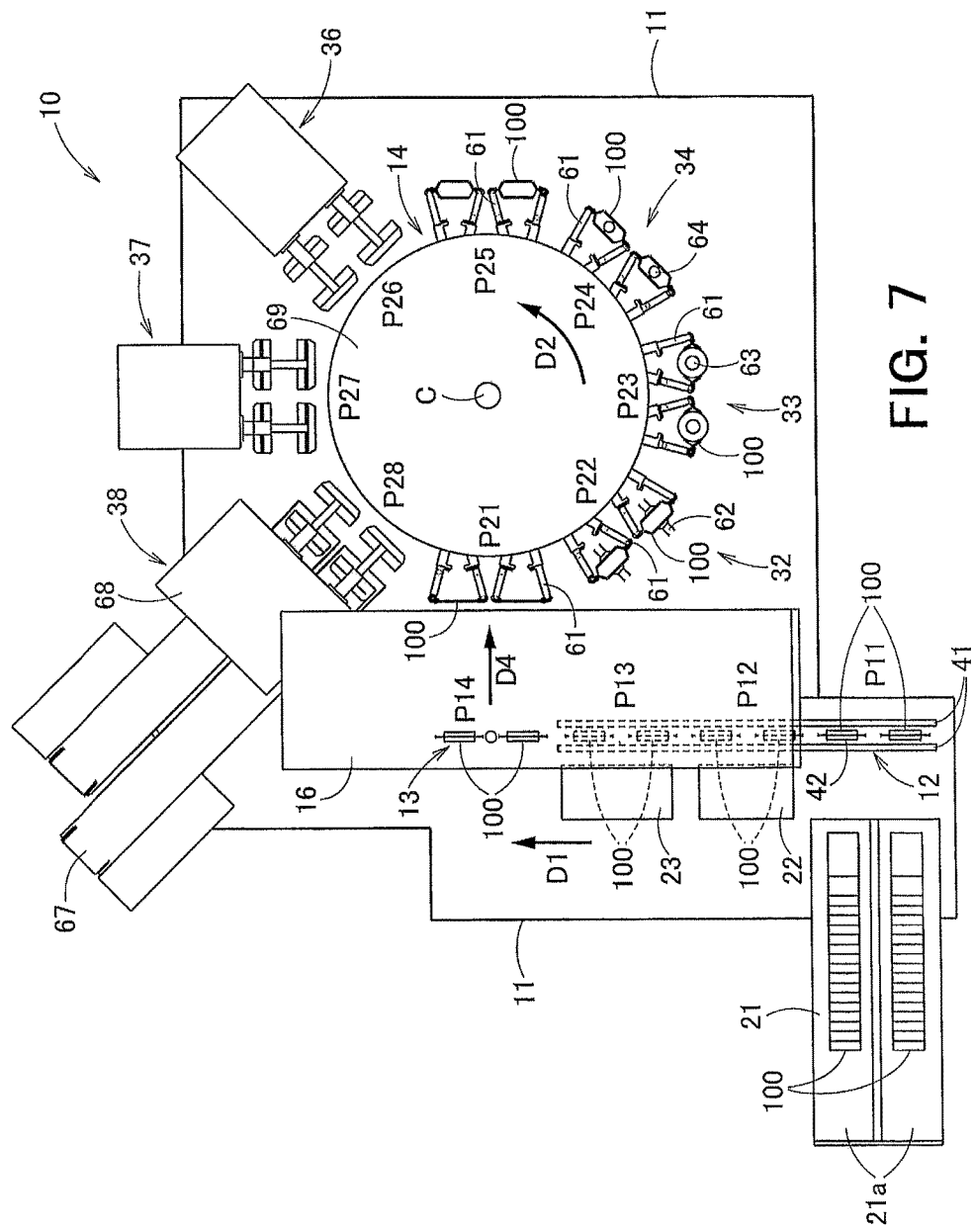
FIG. 7 is a plan view showing a schematic configuration of a packaging machine according to a first variation.

FIG. 7 is a plan view showing a schematic configuration of a packaging machine 10 according to a first variation, showing a state of a packaging machine 10 viewed from above. The arrangement of various devices is not limited to the above-described example, and for instance, the linear type conveyance unit 12 and the rotary type conveyance unit 14 may be arranged as shown in FIG. 7.

In this variation, the print bag supply processing station (fourth conveyance position) P21 is distant from the delivery processing station (third conveyance position) P14 in the direction (fourth direction D4) perpendicular to the conveyance direction (first direction D1) of packaging bags 100 caused by the linear type conveyance unit 12. Furthermore, the rotation center C of the rotary table 69 of the rotary type conveyance unit 14 is positioned on a line formed by extending the line connecting the delivery processing station P14 with the print bag supply processing station P21, and the line connecting the rotation center C with the delivery processing station P14 extends in a direction perpendicular to the conveyance direction (first direction D1) of packaging bags 100 caused by the linear type conveyance unit 12.

Thus, the opening/closing chuck 75 (third supporting unit) is not required to be rotated by the delivery driving unit 77 (see FIG. 2) after a packaging bag 100 is supplied from the linear type conveyance unit 12 to the opening/closing chuck 75 and before the packaging bag 100 is supplied from the opening/closing chuck 75 to the rotary type conveyance unit 14 (a gripper pair 61 (fourth supporting unit)). Specifically, only by causing the delivery driving unit 77 to translate the opening/closing chuck 75 in the fourth direction D4 so as to move the opening/closing chuck 75 and a packaging bag 100 from the delivery processing station P14 to the bag supply processing station P21, the packaging bag 100 can be smoothly delivered from the opening/closing chuck 75 to a gripper pair 61.

[Second Variation]

Figure 8:
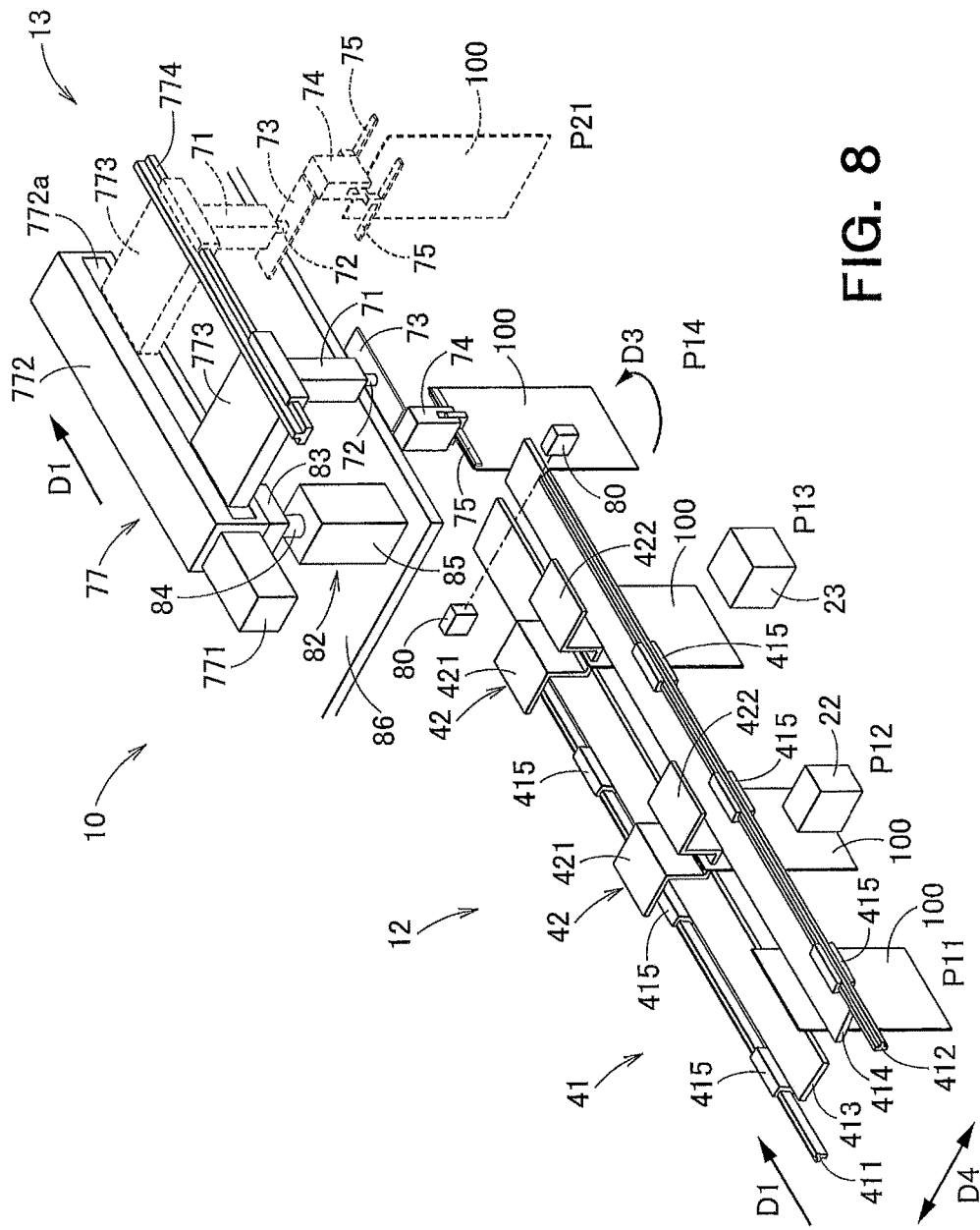
FIG. 8 is an oblique view illustrating a schematic configuration of a linear type conveyance unit and a delivery unit according to a second variation.

FIG. 8 is an oblique view illustrating a schematic configuration of a linear type conveyance unit 12 and a delivery unit 13 according to a second variation. In the present variation, the position in terms of the height direction of a packaging bag 100 supported by the opening/closing chuck 75 (the third supporting unit) is adjusted at the delivery processing station P14, at the print bag supply processing station P21, or at between the delivery processing station P14 and the print bag supply processing station P21. Specifically, the packaging machine 10 according to the present variation comprises: a position detection unit 80 which detects the position in terms of the height direction of a packaging bag 100 before being supplied to the opening/closing chuck 75 or of a packaging bag 100 being supported by the opening/closing chuck 75; and an elevating mechanism 82 which can change the position in terms of the height direction of the opening/closing chuck 75 according to the position in terms of the height direction of the packaging bag 100 detected by the position detection unit 80.

The position detection unit 80 preferably detects the height direction position of a packaging bag 100 right before being delivered from the linear type conveyance unit 12 to the delivery unit 13, and more preferably detects the height direction position of a packaging bag 100 being supported by the opening/closing chuck 75. In the example illustrated in FIG. 8, the position detection unit 80 is provided between the print inspection processing station P13 and the delivery processing station P14, and the height direction position of a packaging bag 100 just before being delivered from the linear type conveyance unit 12 to the delivery unit 13 is detected. The position detection unit 80 is typically configured by a camera or a position detection sensor, and for example, the position of the upper edge of a packaging bag 100 conveyed is detected by the position detection unit 80. The detection results of the position detection unit 80 are sent to an elevating driving controller 85 of the elevating mechanism 82.

The elevating mechanism 82 includes: an attachment member 83 attached to the delivery driving unit 77 (in particular, to the delivery box 772) in a fixed manner; an elevating axis 84 attached to the attachment member 83; and the elevating driving controller 85 causing the elevating axis 84 to linearly move in the height direction (i.e., vertical direction). The elevating axis 84 has an arbitrary configuration which is capable of changing the height direction position of the leading end to which the attachment member 83 is attached, and may be configured by a ball screw for example. The elevating driving controller 85 is configured by a motor or another element, and can adjust the height direction position of the leading end of the elevating axis 84 so as to dispose the attachment member 83 attached to the leading end of the elevating axis 84 at the desired height direction position. In particular, the elevating driving controller 85 in the present example controls the amount of protrusion of the elevating axis 84 according to the height direction position of a packaging bag 100 detected by the position detection unit 80 so as to arrange the packaging bag 100 supported by the opening/closing chuck 75 at a proper height direction position. The elevating driving controller 85 is held by an elevating mechanism holding unit 86 fixed in terms of the height direction, and the height direction position of the whole of the delivery unit 13 including the opening/closing chuck 75 and the delivery driving unit 77 can be changed with reference to the elevating mechanism holding unit 86.

According to the present variation having the above-described structure, the height direction position of the opening/closing chuck 75 is adjusted by the elevating mechanism 82 via the delivery driving unit 77. For instance, when the height direction position of a packaging bag 100 detected by the position detection unit 80 is lower than the predetermined height direction position, the amount of protrusion of the elevating axis 84 is increased under the control of driving of the elevating driving controller 85 after the packaging bag 100 is delivered to the opening/closing chuck 75, so that the opening/closing chuck 75 is uplifted together with the attachment member 83 and the delivery driving unit 77. In this case, the opening/closing chuck 75 is uplifted by the distance corresponding to the difference (gap) between the height direction position of the packaging bag 100 detected by the position detection unit 80 and the original predetermined height direction position, in such a manner that the packaging bag 100 is arranged at the original predetermined height direction position. Similarly, when the height direction position of a packaging bag 100 detected by the position detection unit 80 is higher than the predetermined height direction position, the amount of protrusion of the elevating axis 84 is decreased after the packaging bag 100 is delivered to the opening/closing chuck 75, so that the opening/closing chuck 75 descends together with the attachment member 83 and the delivery driving unit 77, and the packaging bag 100 is arranged at the original predetermined height direction position.

The detection results of the position detection unit 80 may be directly sent to the elevating driving controller 85, or may be indirectly sent to the elevating driving controller 85 after being sent to a controller (not illustrated). Furthermore, the difference (gap) between the height direction position of a packaging bag 100 detected by the position detection unit 80 and the original predetermined height direction position may be determined by the position detection unit 80 or may be determined by the elevating driving controller 85. Moreover, the difference (gap) between the height direction position of a packaging bag 100 detected by the position detection unit 80 and the original predetermined height direction position may be determined by the controller (not illustrated) which has received the detection results of the position detection unit 80.

As described above, according to the present variation, the height direction position of a packaging bag 100 supported by the opening/closing chuck 75 can be corrected so as to be the proper position. Thus, even if the height direction position of a packaging bag 100 is displaced at a stage prior to the print bag supply processing station P21 (in particular, a stage where the packaging bag 100 is delivered between the supporting elements), the package bag 100 which has been corrected to be arranged in a proper height direction position can be delivered to a gripper pair 61 of the rotary type conveyance unit 14.

The elevating mechanism 82 of the present example has a structure by which the height direction position of the whole of the delivery unit 13 (the delivery driving unit 77 and the opening/closing chuck 75) can be changed, and may have an arbitrary structure by which the position in terms of the height direction of the opening/closing chuck 75 can be directly or indirectly adjusted. For example, the elevating mechanism 82 may have a mechanism which can directly change the height direction position of the opening/closing chuck 75.

[Other Variations]

The present invention is not limited to the above-described embodiments and variations, and other modifications may be suitably applied.

For instance, in the above-described embodiments, various processes are carried out during stop periods of intermittent conveyance; however, a packaging bag 100 is not necessarily conveyed intermittently, and various processes may be carried out on a packaging bag 100 conveyed continuously.

Furthermore, the above-described embodiments merely show specific examples of application of the present invention, and other devices which can fulfill functions equivalent to the various devices described above may be used. Moreover, another device, apart from the various devices described above, may be appropriately provided. For example, in the above-described embodiments, an example is described in which the printing unit 22 and the printing inspection unit 23 are provided as the "first processing system performing processes on packaging bags 100 which are conveyed by the linear type conveyance unit 12"; however, instead of or in addition to the printing unit 22 and the printing inspection unit 23, devices such as a code reader and a labeler may be included in the first processing system. For example, one dimensional codes and/or two dimensional codes such as QR codes (registered trademark) attached to packaging bags 100 may be read by the code reader, and it may be judged whether or not the packaging bags 100 conveyed by the linear type conveyance unit 12 are proper. Furthermore, a label seal on which various information, such as the expiration date and ingredients, is written may be attached, by using the labeler, to a packaging bag 100 conveyed by the linear type conveyance unit 12. In such a case, the printing unit 22 may be omitted.

The present invention is not limited to the above embodiments and variations, and may include various aspects to which various modifications which those skilled in the art could achieve are applied, and the effects brought about by the present invention are also not limited to the above-described effects. Therefore, various additions, modifications and partial omission may be applied to each element described in the claims and the specification without departing from the scope of the technical idea and purport of the present invention.

The invention claimed is:

1. A packaging machine comprising:
a linear type conveyance unit which conveys a packaging bag in a linear manner in a first direction;
a rotary type conveyance unit which conveys the packaging bag in a rotational manner in a second direction;
a delivery unit which delivers the packaging bag between the linear type conveyance unit and the rotary type conveyance unit;
a first processing system which performs processing on the packaging bag conveyed by the linear type conveyance unit; and
a second processing system which performs processing on the packaging bag conveyed by the rotary type conveyance unit,
wherein the linear type conveyance unit includes:
a first supporting unit which moves from a first conveyance position to a second conveyance position while supporting the packaging bag in a suspended state; and
a second supporting unit which receives the packaging bag from the first supporting unit being disposed at the second conveyance position and supports the packaging bag in a suspended state,
wherein the first processing system performs the processing thereof only in a state where the packaging bag is closed,
wherein the second processing system includes an opening processing unit which opens the packaging bag,
wherein the first supporting unit is able to move in a reciprocal manner between the first conveyance position and the second conveyance position, the first supporting unit moving from the first conveyance position to the second conveyance position in the first direction while supporting the packaging bag in the suspended state, and moving from the second conveyance position to the first conveyance position without supporting the packaging bag; and wherein the second supporting unit, fixed with respect to the first direction, is able to Perform a gripping action and a grip release action so as to receive the packaging bag from the first supporting unit and support the packaging bag in a suspended state when the first supporting unit is at the second conveyance position, and to deliver the packaging bag to the first supporting unit and not support the packaging, bag when the first supporting unit is at the first conveyance position.

2. The packaging machine according to claim 1, wherein the second processing system includes a content supply unit which feeds a content into the packaging bag which is in an open state.

3. The packaging machine according to claim 2, wherein the delivery unit includes:

a third supporting unit for supporting the packaging bag in a suspended state; and a delivery driving unit which reciprocates the third supporting unit between a third conveyance position and a fourth conveyance position, wherein the third supporting unit receives the packaging bag at the third conveyance position from the linear type conveyance unit, and supplies the packaging bag to the rotary type conveyance unit at the fourth conveyance position.

4. The packaging machine according to claim 3, wherein the fourth conveyance position is distant from the third conveyance position in a direction perpendicular to the first direction.

5. The packaging machine according to claim 3, further comprising:

a position detection unit which detects a position in a height direction of the packaging bag before being supplied to the third supporting unit or of the packaging bag being supported by the third supporting unit; and an elevating driving unit which is capable of changing the position in the height direction of the third supporting unit according to the position in the height direction of the packaging bag detected by the position detection unit.

6. The packaging machine according to claim 3, wherein the delivery driving unit rotates the third supporting unit by prescribed degrees.

7. The packaging machine according to claim 6, wherein the rotary type conveyance unit includes: a rotation body; and a fourth supporting unit which is attached to the rotation body and is provided for supporting the packaging bag, wherein a rotation center of the rotation body lies in an extension of a linear conveyance track of the packaging bag conveyed by the linear type conveyance unit, and wherein the delivery driving unit rotates the third supporting unit by 90 degrees after the packaging bag is delivered from the linear type conveyance unit to the third supporting unit and before the packaging bag is delivered from the third supporting unit to the rotary type conveyance unit.

8. The packaging machine according to claim 2, wherein the first processing system includes a printing unit which performs printing on the packaging bag conveyed by the linear type conveyance unit.

9. The packaging machine according to claim 8, wherein the first processing system includes a printing inspection unit which is located on a downstream side from the printing unit and inspects quality of the printing on the packaging bag.

10. The packaging machine according to claim 9, further comprising a discharge unit which discharges the packaging bag having a defect according to an inspection result of the printing inspection unit.

11. The packaging machine according to claim 1, wherein the delivery unit includes:

a third supporting unit for supporting the packaging bag in a suspended state; and a delivery driving unit which reciprocates the third supporting unit between a third conveyance position and a fourth conveyance position, wherein the third supporting unit receives the packaging bag at the third conveyance position from the linear type conveyance unit, and supplies the packaging bag to the rotary type conveyance unit at the fourth conveyance position.

12. The packaging machine according to claim 11, wherein the delivery driving unit rotates the third supporting unit by prescribed degrees.

13. The packaging machine according to claim 12, wherein the rotary type conveyance unit includes: a rotation body; and a fourth supporting unit which is attached to the rotation body and is provided for supporting the packaging bag, wherein a rotation center of the rotation body lies in an extension of a linear conveyance track of the packaging bag conveyed by the linear type conveyance unit, and wherein the delivery driving unit rotates the third supporting unit by 90 degrees after the packaging bag is delivered from the linear type conveyance unit to the third supporting unit and before the packaging bag is delivered from the third supporting unit to the rotary type conveyance unit.

14. The packaging machine according to claim 11, wherein the fourth conveyance position is distant from the third conveyance position in a direction perpendicular to the first direction.

15. The packaging machine according to claim 11, further comprising:

a position detection unit which detects a position in a height direction of the packaging bag before being supplied to the third supporting unit or of the packaging bag being supported by the third supporting unit; and an elevating driving unit which is capable of changing the position in the height direction of the third supporting unit according to the position in the height direction of the packaging bag detected by the position detection unit.

16. The packaging machine according to claim 1, wherein the first processing system includes a printing unit which performs printing on the packaging bag conveyed by the linear type conveyance unit.

17. The packaging machine according to claim 16, wherein the first processing system includes a printing inspection unit which is located on a downstream side from the printing unit and inspects quality of the printing on the packaging bag.

18. The packaging machine according to claim 17, further comprising a discharge unit which discharges the packaging bag having a defect according to an inspection result of the printing inspection unit.

19. A packaging method comprising the steps of:

causing a linear type conveyance unit to convey a packaging bag in a linear manner in a first direction;

causing a rotary type conveyance unit to convey the packaging bag in a rotational manner in a second direction;

causing a delivery unit to deliver the packaging bag between the linear type conveyance unit and the rotary type conveyance unit;

causing a first processing system to perform processing on the packaging bag conveyed by the linear type conveyance unit; and causing a second processing system to perform processing on the packaging bag conveyed by the rotary type conveyance unit, wherein the step of causing the linear type conveyance unit to convey a packaging bag includes the steps of:
 causing a first supporting unit to move from a first conveyance position to a second conveyance position while supporting the packaging bag in a suspended state; and
 causing a second supporting unit to receive the packaging bag from the first supporting unit being disposed at the second conveyance position and supports the packaging bag in a suspended state, wherein the first processing system performs the processing thereof only in a state where the packaging bag is closed, wherein the second processing system includes an opening processing unit which opens the packaging bag, wherein the first supporting unit is able to move in a reciprocal manner between the first conveyance position and the second conveyance position, the first supporting unit moving from the first conveyance position to the second conveyance position in the first direction while supporting the packaging bag in the suspended state, and moving from the second conveyance position to the first conveyance position without supporting the packaging bag; and wherein the second supporting unit, fixed with respect to the first direction, is able to perform a gripping action and a grip release action so as to receive the packaging bag from the first supporting unit and support the packaging bag in a suspended state when the first supporting unit is at the second conveyance position, and to deliver the packaging bag to the first supporting unit and not support the packaging bag when the first supporting unit is at the first conveyance position.

* * * * *